United States Patent [19]

Okuyama et al.

[11] Patent Number: 5,092,946
[45] Date of Patent: Mar. 3, 1992

[54] METHOD FOR STICKING A BELT-LIKE MEMBER AND APPARATUS THEREFORE

[75] Inventors: Koji Okuyama, Kawagoe; Makoto Yamamoto, Akikawa; Akihito Ichinohe, Kodaira, all of Japan

[73] Assignee: Bridgestone Corporation, Tokyo, Japan

[21] Appl. No.: 448,433

[22] Filed: Dec. 11, 1989

[30] Foreign Application Priority Data

Feb. 22, 1989 [JP] Japan ................................. 1-40263
Apr. 13, 1989 [JP] Japan ................................. 1-91896

[51] Int. Cl.⁵ ........................................... B29D 30/44
[52] U.S. Cl. ............................................ 156/64; 83/614; 156/124; 156/134; 156/406.4
[58] Field of Search ............... 156/123, 64, 130, 130.7, 156/133, 134, 405.1, 406.4, 406.6, 256; 83/42, 155, 485, 486, 486.1, 487, 614, 658

[56] References Cited

U.S. PATENT DOCUMENTS

| | | | |
|---|---|---|---|
| 4,457,802 | 7/1984 | Yanagihara | 156/406.4 |
| 4,769,104 | 9/1988 | Okuyama et al. | 156/406.4 |
| 4,804,426 | 2/1989 | Okuyama et al. | 156/134 |
| 4,824,515 | 4/1989 | Still et al. | |
| 4,892,609 | 1/1990 | Nakanome et al. | 156/406.4 |
| 4,961,813 | 10/1990 | Bailey | 156/406.4 |
| 4,965,733 | 10/1990 | Kimura et al. | 83/614 X |

FOREIGN PATENT DOCUMENTS

62-13779  4/1987  Japan .
63-116838  5/1988  Japan .
1-183396  7/1989  Japan .

Primary Examiner—Geoffrey L. Knable
Attorney, Agent, or Firm—Sughrue, Mion, Zinn, Macpeak & Seas

[57] ABSTRACT

A method and an apparatus for sticking a belt-like member, wherein a belt-like member prepared by cutting a raw material of the belt-like member on a conveyor at two front and rear locations, is conveyed by the conveyor, wrapped around a cylindrical drum and stuck to the drum. The inclination angle of the cut line at the leading end of the belt-like member is measured at the time of cutting, the inclination angle of the cut line at the trailing end is measured at the time of cutting, and by comparing the inclination of the cut line at the trailing end with the inclination angle at the leading end, an amount of correction for the inclination angle is calculated. After cutting at the trailing end, the trailing end portion is attracted and held by an attracting device, and by rotating this attracting device on the basis of the aforementioned amount of correction for the inclination angle, the inclination angle of the cut line at the trailing end is corrected so as to coincide with the inclination angle of the cut line at the leading end. While maintaining this corrected condition, the belt-like member is wrapped around the cylindrical drum and stuck to the drum. The belt-like member after completion of wrapping has its leading end edge and its trailing end edge surly coincide with each other, and a step-shaped deviation or the like would not arise.

8 Claims, 18 Drawing Sheets

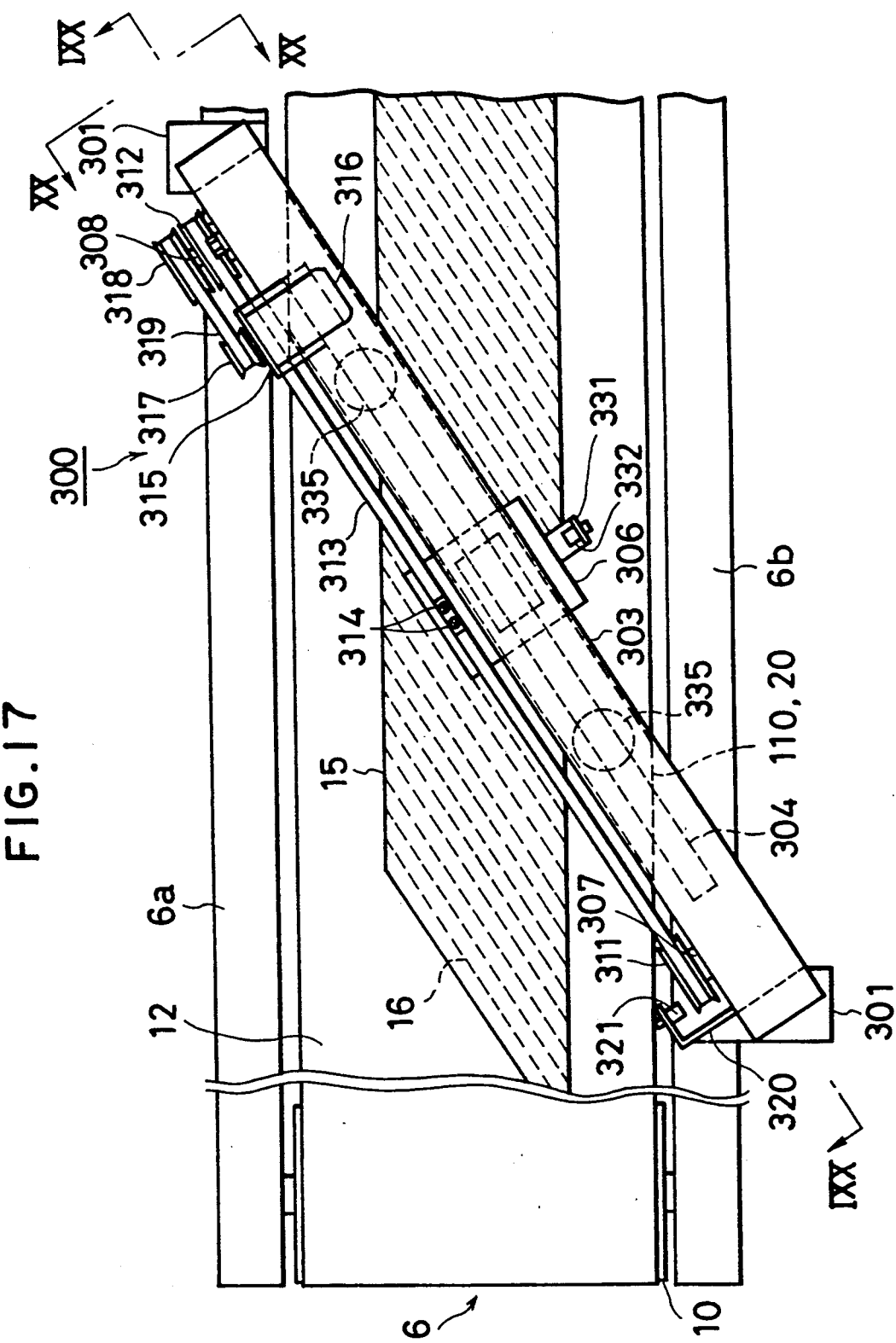

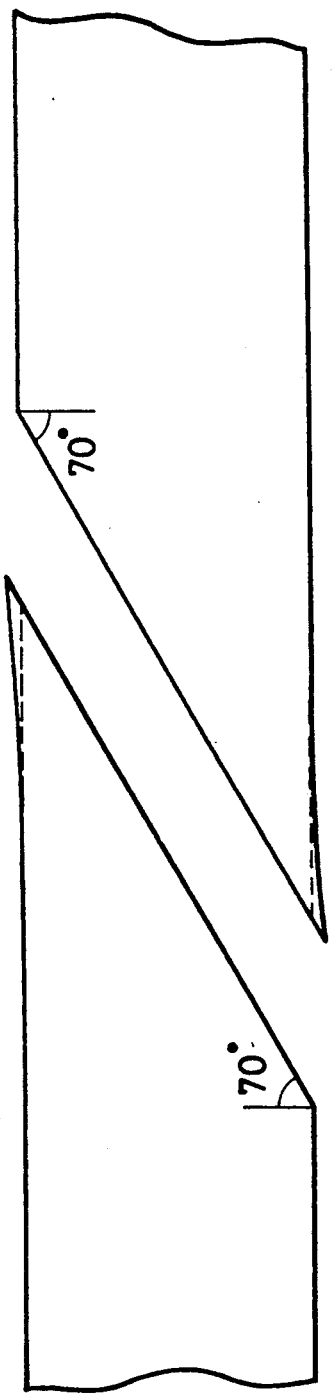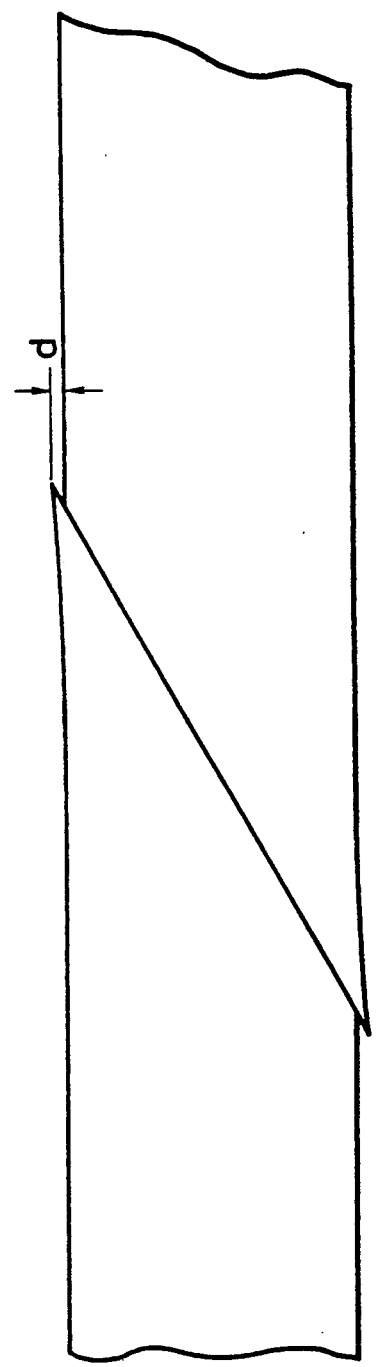
FIG.21(a) PRIOR ART
FIG.21(b) PRIOR ART

METHOD FOR STICKING A BELT-LIKE MEMBER AND APPARATUS THEREFORE

BACKGROUND OF THE INVENTION

1. Field of the invention

The present invention relates to a method for applying a belt-like member and an apparatus for practicing the same method, which are available generally in every step of the tire forming process but mainly useful for sticking a belt-like member made of a rubber sheet having a large number of cords buried in parallel therein onto a forming drum.

2. Description of the prior art

Generally in the manufacture of tires, the steps of cutting a rubber-coated cord-reinforced cloth having wires inserted therein at a predetermined bias angle or at a right angle, along the wires into a predetermined length to form an elongated belt-like member, wrapping the thus formed belt-like member around a forming drum, and joining the leading end and the trailing end of the member, are involved.

In the prior art, normally the belt-like member was wrapped around and stuck to a forming drum while its length in the longitudinal direction was being appropriately stretched so that when it had been finished to be wrapped, the leading end and the trailing end thereof might coincide with each other.

However, the cut angle of the cut end of the belt-like member had a distribution, hence the cut angles of the leading end edge and the trailing end edge were not always consistent. It was fairly probable that even if one should try to make the leading and trailing end edges coincide with each other, there would occur deviation or overlap.

Therefore, an attempt of correcting the cut surface of the belt-like member to have a predetermined inclination angle (Laid-Open Japanese Patent Specification No. 63-116838 (1989)) was proposed.

According to this proposal in the prior art, it was attempted that a swingable correcting arm is made to butt against the cut surfaces at the leading and trailing ends of the cut belt-like member to correct the inclination angles of these cut surfaces to a predetermined angle. Thus, the inclination angles of the end surfaces at the leading end and at the trailing end are made to coincide with each other, and thus joining of the opposite end surfaces can be effected properly.

However, since the leading end surface and the trailing end surface of the belt-like member which are respectively cut with a certain inclination angle are forcibly corrected to a predetermined angle by making the end surfaces butt against a correcting arm, for instance, as shown in FIG. 21(a) if an end surface having a cut angle of 71 degrees should be forcibly corrected so as to have a predetermined angle of 70 degrees. However, an acute angle portion at the tip end would somewhat protrude outwardly, and when such both end portions are joined together, an inconvenience of producing a step-shaped deviation d as shown in FIG. 21(b) is liable to occur.

In addition, in order to treat a member after cutting into a predetermined length, a separate treatment device becomes necessary, hence the apparatus becomes large-sized, a necessary space is largely occupied, and also an installation cost would be increased.

SUMMARY OF THE INVENTION

The present invention has been worked out in view of the above-mentioned background of the invention. One object of the invention is to provide a method and an apparatus for sticking a belt-like member, in which a step-shaped deviation of the cut ends of the belt-like member at a joining portion can be prevented and small-sized low-cost apparatuses can be realized.

According to one feature of the present invention, there is provided a method for sticking a belt-like member, wherein a belt-like member prepared by cutting a raw material of the belt-like member on a conveyor at two front and rear locations, is conveyed by the conveyor, wrapped around a cylindrical drum and stuck to the drum. The method comprises the steps of cutting the raw material of the belt-like member on an anvil placed on the conveyor while being fixedly attracted to a conveyor belt to form a leading end edge of the belt-like member and simultaneously measuring an inclination angle of the cut line; holding the leading end portion of the belt-like member, separating it from the anvil, conveying it as synchronized with the conveyor up to a predetermined position beyond the anvil, and then fixedly attracting it onto the conveyor belt; conveying the raw material of the belt-like member having the leading end edge formed by a predetermined distance by means of the conveyor belt; cutting this raw material of the belt-like member at the predetermined position to form a trailing end edge of the belt-like member and simultaneously measuring an inclination angle of the cut line; holding the trailing end portion of the belt-like member separating it from the anvil, and conveying it as synchronized with the conveyor up to a predetermined position beyond the anvil; changing the holding attitude of the trailing end portion on the basis of the measured inclination angles of the respective cut lines to correct the inclination angle of the cut line of the trailing end edge so as to coincide with the inclination angle of the cut line of the leading end edge; transferring the trailing end portion of the belt-like member onto the conveyor belt while maintaining the thus corrected configuration of the trailing end portion and fixedly attracting it to the conveyor belt; separating the succeeding raw material of the belt-like member from the conveyor belt; conveying the belt-like member cut out of the raw material by means of the conveyor belt; making the cylindrical drum attract the leading end portion of the belt-like member; and wrapping and sticking the belt-like member around and to the cylindrical drum by rotating the cylindrical drum in synchronism with traveling of the conveyor belt.

According to the present invention, since an inclination angle of the cut line at the leading end edge of a belt-like member is measured previously and after cutting of the trailing end edge only the inclination angle of the cut line at the trailing end is corrected by changing a holding attitude of the trailing end portion to conform to the measured inclination angle of the cut line at the leading end edge, step-shaped deviation would hardly occur, and as the belt-like member is stuck to a cylindrical drum while always maintaining the configuration of the end portions, joining of the leading end and the trailing end can be effected properly.

According to another feature of the present invention, there is provided an apparatus for sticking a belt-like member, wherein a belt-like member prepared by cutting a raw material of the belt-like member on a conveyor is conveyed, wrapped around a cylindrical drum and stuck thereto, which apparatus comprises cut means for cutting a raw material of the belt-like member, measure means for measuring an inclination angle of the cut line, hold means for holding the end portions before and behind the cut line of the belt-like member respectively and independently while maintaining their configurations, correction means capable of correcting an inclination angle of a trailing end edge of the belt-like member by changing the attitude of the hold means on the basis of the results of measurement by the measure means, and separation means capable of separating the raw material of the belt-like member, that has not yet been cut, from the belt conveyor.

According to the present invention, the belt-like member is cut by the cut means while it is fixed on an anvil by attraction means, upon cutting the leading end edge an inclination angle of the cut line is measured by the measure means, and after cutting of the trailing end edge, the attitude of the hold means which holds the trailing end portion is changed by the correction means on the basis of the results of measurement by the aforementioned measure means, thereby only the trailing end surface of the belt-like member can be corrected to conform to the inclination angle of the cut line of the leading end surface. Since only the trailing end portion is corrected, step-shaped deviation would hardly occur.

In addition, it is possible that the raw material of the belt-like member which has not yet been cut is separated from the conveyor belt by the separation means, and only the cut belt-like member is conveyed and stuck onto the cylindrical drum.

Furthermore, since the end portions of the belt-like member has its configuration always maintained by the attraction means and the hold means, when the belt-like member has been stuck onto the cylindrical drum, the leading and trailing end surfaces can be properly aligned.

Also, compactization and reduction of a cost of the apparatus can be achieved.

The above-mentioned and other objects, features and advantages of the present invention will become more apparent by reference to the following description of one preferred embodiment of the invention taken in conjunction with the accompanying drawings.

BRIEF DESCRIPTION OF THE DRAWINGS

In the accompanying drawings:

FIG. 17 is a plan view showing a modification of a cutting device;

FIGS. 21(a) and 21(b) are schematic views showing the states of the end portions of a belt-like member when the end portions are joined together through a method in the prior art.

DESCRIPTION OF THE PREFERRED EMBODIMENT

Now the present invention will be described in greater detail in connection to one preferred embodiment of the invention illustrated in FIGS. 1 to 16.

Figure 1:
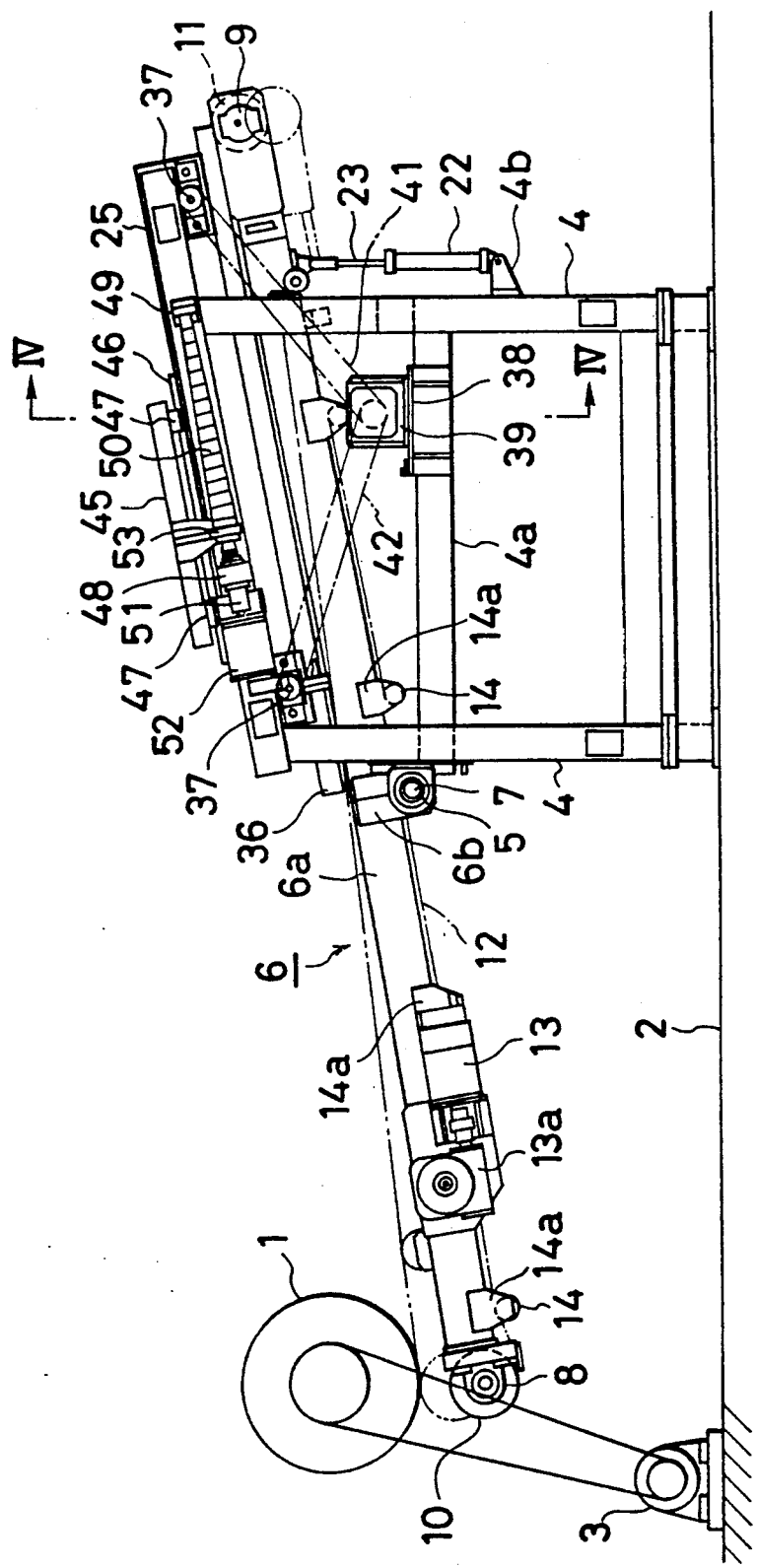
FIG. 1 is a general side view of a belt-like member sticking apparatus according to one preferred embodiment of the present invention.
Figure 2:
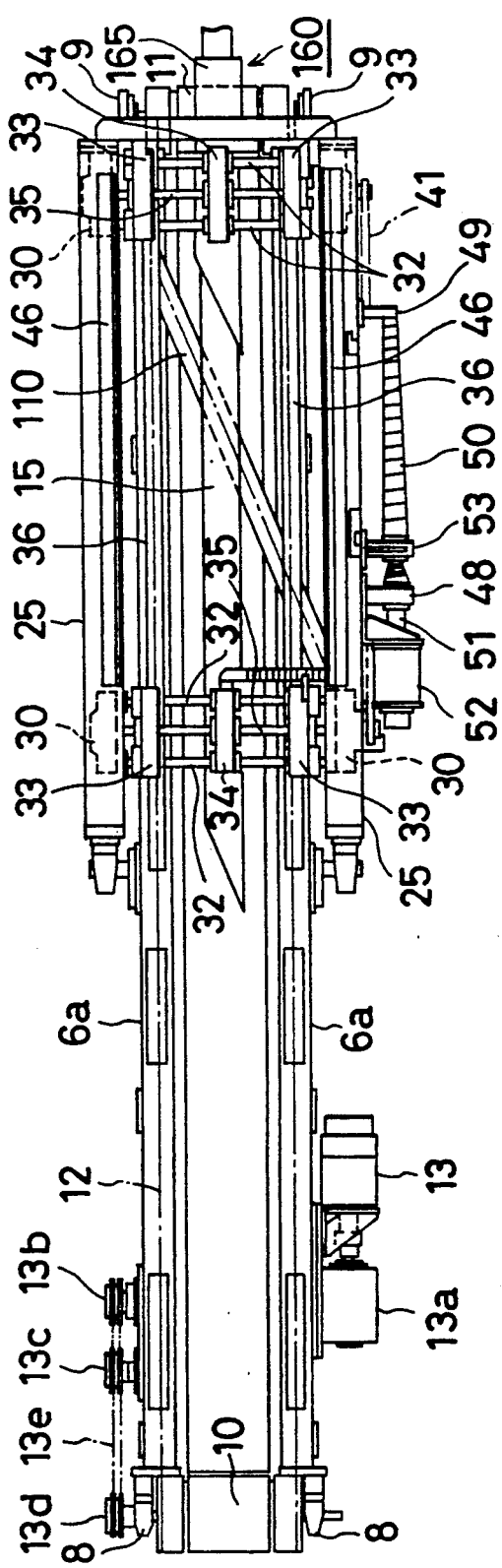
FIG. 2 is a plan view partly omitted of the same apparatus.

A belt-like member sticking apparatus according to one preferred embodiment of the present invention is generally illustrated in FIGS. 1 and 2. In these figures, reference numeral 1 designates a drum, which is rotatably supported from a frame not shown, and is rotated by a DC servo motor 3 associated with reduction gears that is installed on a floor surface 2.

On the floor surface 2 behind the drum 1, four struts 4 are erected at the front and at the rear on the left and right sides, and between the adjacent struts 4 are mounted a horizontal support frame 4a.

Between the left and right struts 4 is disposed an elongated conveyor 6, a support shaft 7 directed in the left and right horizontal directions is fixed to brackets 6b suspended from the centers of the conveyor frames 6a of the same conveyor 6, and this support shaft 7 is rotatably supported by bearings 5 fixedly secured respectively to the pair of left and right struts 4 at the front.

Accordingly, the conveyor 6 is swingable about the support shaft 7, and the front end portion of the conveyor 6 can move up and down under the aforementioned drum 1.

On the rear struts 4 are provided brackets 4b as projected backwards, at the tip end portion of the bracket 4b is pivotably supported a lower base end portion of a cylinder 22 directed in the vertical directions, and a tip end of an upwardly projected rod 23 of the same cylinder 22 is rotatably engaged with the lower surface of the conveyor frame 6a. Hence, the conveyor 6 can be made to swing by driving the cylinder 22 and extending and contracting the rod 23.

In the conveyor 6, a pair of front and rear rollers 10 and 11 are rotatably supported via bearings 8 and 9 provided respectively at the front and rear ends of the conveyor frame 6a, and between these rollers 10 and 11 is stretched a conveyor belt 12.

Under the conveyor belt 12 are disposed receiver rollers 14 at four locations separated by appropriated intervals. The receiver rollers 14 are rotatably mounted between brackets 14a suspended from the left and right conveyor frames 6a and prevent the conveyor belt 12 from sagging.

On the left side conveyor frame 6a, a D.C. servo motor 13 is fixed to its outside, it is adapted to drive a pulley 13b provided on the outside of the right side conveyor frame 6a as projected therefrom, in correspondence to the pulley 13b a pulley 13c is provided and a pulley 13d is fitted to the rotary shaft of the above-described roller 10. Belt 13e is stretched among the pulleys 13b, 13c and 13d (See FIG. 2). Accordingly, by driving the servo motor 13, the roller 10 is rotated via the belt 13e and thereby the conveyor belt 12 can be revolved.

Figure 3:
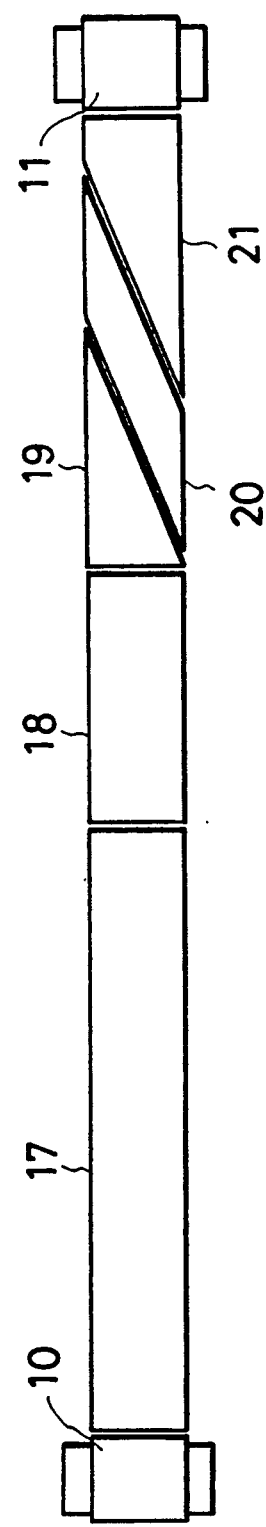
FIG. 3 is a schematic view showing an arrangement of magnet blocks provided within a conveyor.

Between the conveyor belts 12 on the upper side and on the lower side are disposed plate-shaped magnet blocks 17, 18, 19, 20 and 21 as shown in FIG. 3. The magnet block 17 at the foremost position is rectangular and longest, the next rear magnet block 18 is rectangular and short, further succeeding magnet blocks 19, 20 and 21 have a rectangular shape as a whole, in which a parallelogram-shaped magnet block 20 is disposed obliquely at the center and triangular magnet blocks 19 and 21 are disposed before and behind the magnet block 20. Except for the magnet block 17, all the magnet blocks 18, 19, 20 and 21 are independently supported in a vertically movable manner.

Figure 5:
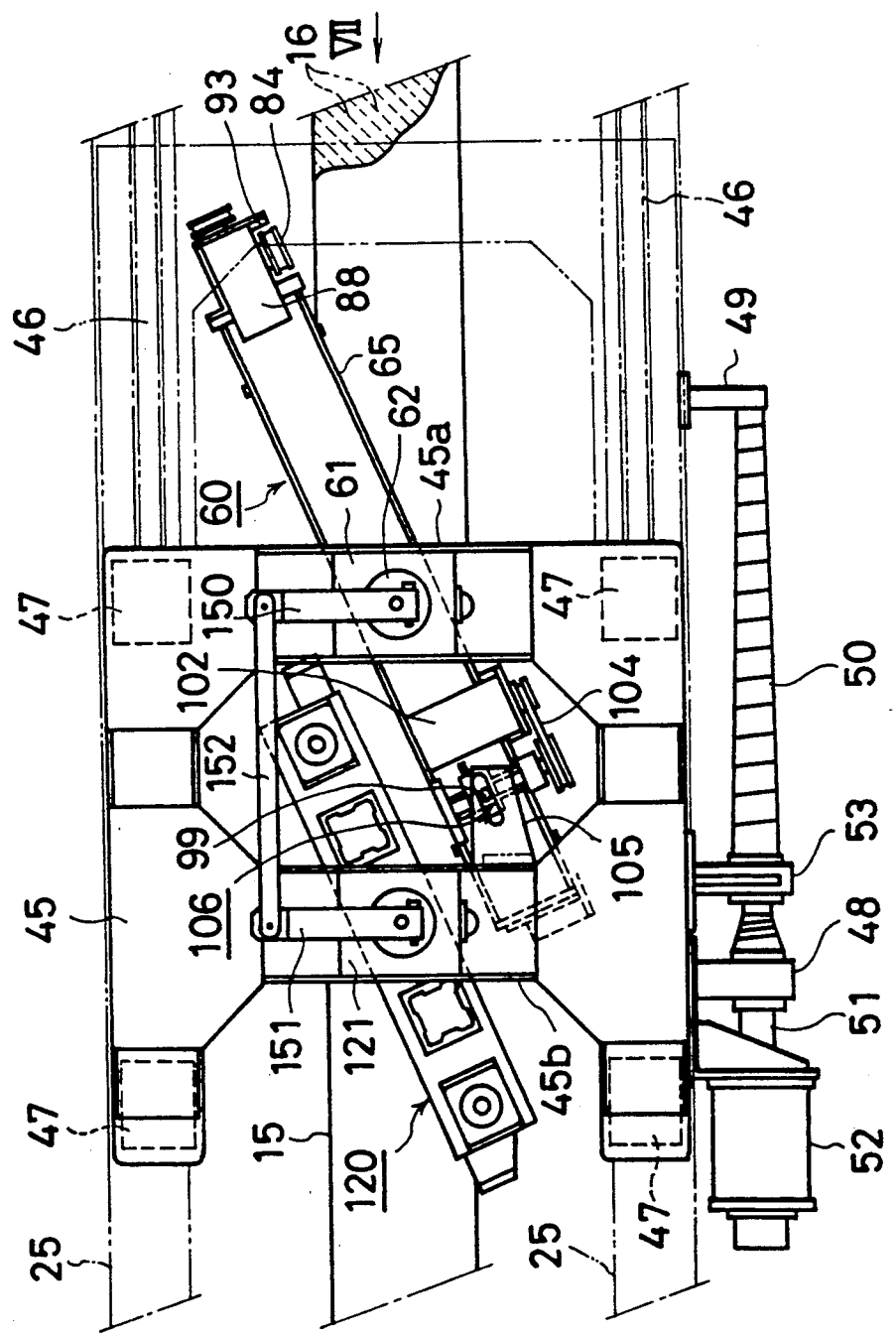
FIG. 5 is a plan view showing a traveling mechanism in a traveling support base.

At the top of the struts 4, a pair of left and right upper frames 25 are mounted as inclined to somewhat descend forwards, from the same upper frames 25 is suspended a left and right positioning device, also between the respective upper frames 25 is mounted a traveling support base 45 to be allowed to travel back and forth, and as shown in FIG. 5, a cutting device 60 and an attraction device 120 are suspended above the conveyor belt 12 from the same traveling support base 45.

Figure 4:
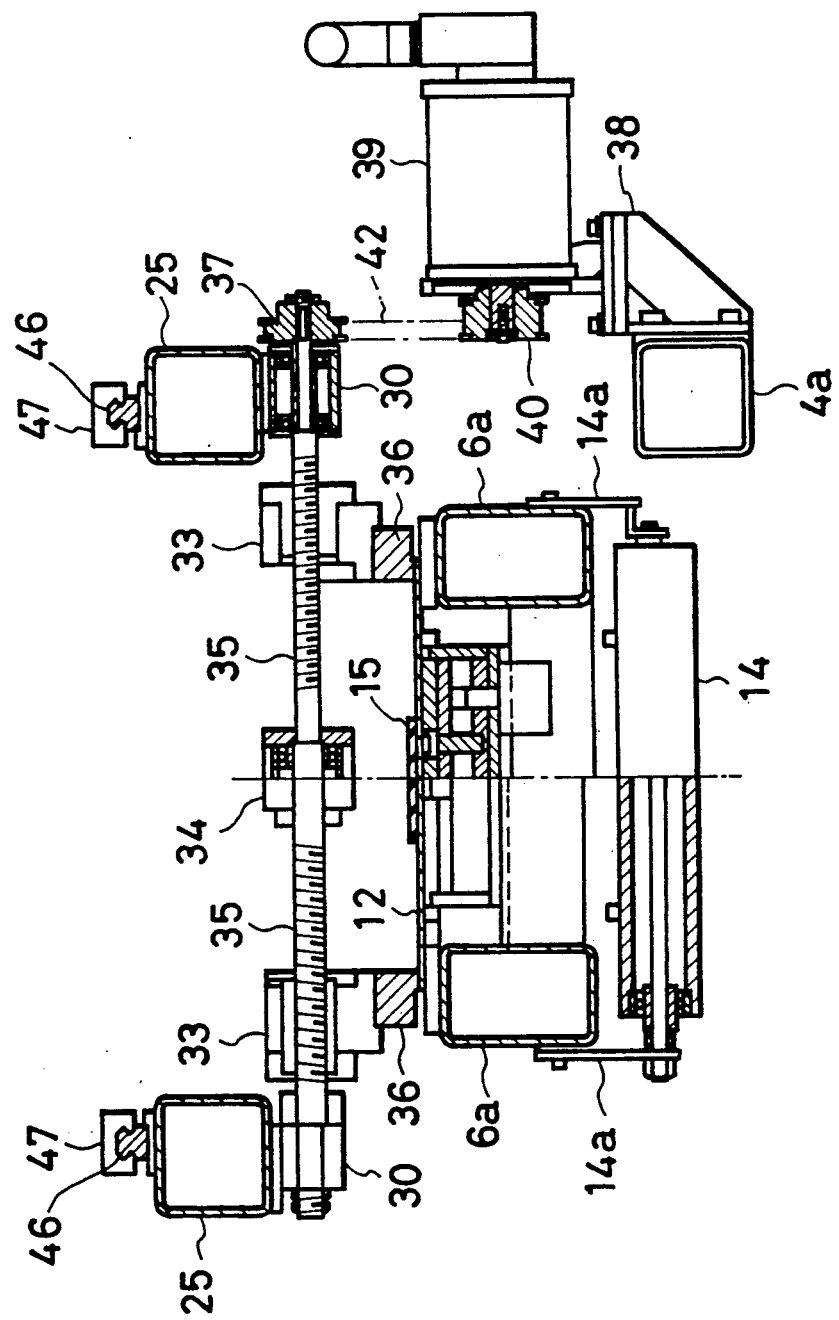
FIG. 4 is a cross-section view taken along line IV—IV in FIG. 1 as viewed in the direction of arrows.

FIGS. 2 and 4 are a plan view of this belt-like member sticking apparatus in which a part such as the traveling support base and the like is omitted, and a cross-section view taken along line IV—IV in FIG. 1, and with reference to these figures, the left and right positioning device will be explained.

To the lower surfaces of the pair of left and right upper frames 25 are fixedly secured bearings 30 at left and right symmetric positions at the rear and the front. Between the opposed bearings 30 are mounted two guide shafts 32 in parallel to each other at the rear and the front, a pair of left and right slide support members 33 are provided in a slidable manner as supported and penetrated by the guide shafts 32. Also a receiver member 34 is fixedly supported at the center.

Between the two guide shafts 32 is provided a ball screw 35 in parallel to the guide shafts 32 as rotatably supported by the opposed bearings 30 and the receiver member 34, and the ball screw penetrates through the left and right slide support members 33 and threadedly engaged therewith.

On the ball screw 35 are formed screw thread in a symmetric manner on the left and right sides. As a result of rotation of the ball screw 35 the slide support members 33 slide symmetrically on the left and right sides.

The above-mentioned mechanism is identical both at the rear and at the front, between the slide support members 33 at the rear and at the front are suspended centering arms 36 in pair on the left side and on the right side as directed back and forth, and so they move symmetrically on the left and right sides jointly with the slide movement of the slide support members 33.

At the condition where the conveyor 6 has been inclined and has become parallel to the upper frames 25, the centering arms 36 are positioned closed to the upper portion of the conveyor belt 12.

The above-mentioned two ball screws 35 at the rear and at the front have their one ends projected from the bearings 30 to the outside, pulleys 37 are fitted and secured to the projected ends, and belts 41 and 42 are respectively extended between the above-mentioned pulleys 37 at the rear and at the front and another pulley 40 fitted and secured to a drive shaft of a servo motor 39 fixedly supported from the above-described horizontal support frame 4a via a bracket 36 (See FIGS. 1 and 4).

Accordingly, as a result of driving by the servo motor 39, the rear and front ball screws 35 are rotated via the belts 42 and 41, hence the centering arms 36 are moved symmetrically on the left and right sides jointly with the slide support members 33 by the rotation of the ball screws 35, and thereby the distance between the centering arms 36 is varied.

Since the centering arms 36 are close to the conveyor belt 12, they perform positioning in the left and right, widthwise direction of a belt-like member placed on the conveyor belt 12 by pinching the belt-like member from the left and the right.

Next a, description will be made on a traveling mechanism of a traveling support base 45. On the upper surfaces of the left and right upper frames 25 are respectively laid linear ball slide guide rails 46 in parallel to the upper frames 25. Linear ball slide guides 47 provided at four corners on the front and rear sides and on the left and right sides of the lower surface of the traveling support base 45 are slidably fitted to the linear ball slide guide rails 46. Hence, the traveling support base 45 is supported to be movable back and forth as mounted to the left and right rails 46 (See FIGS. 2, 4 to 7).

On the outside surface of the upper frame 25 on the left side are provided bearings 48 and 49 at the rear and the front as projected therefrom. A ball screw 50 is rotatably supported between these bearings 48 and 49. A drive shaft projected backward of a D.C. servo motor 52 mounted on the upper frame 25 at a position in front of the ball screw 50 and the front side end portion of the above-mentioned ball screw 50 are connected with each other via a coupling 51.

The ball screw 50 penetrates through a downwardly extended portion of a protrusion 53 projected from the left side surface of the above-described traveling support base 45, and threadedly engages therewith.

Accordingly, when the servo motor 52 is driven, the ball screw 50 is rotated via the coupling 51, and the traveling support base 45 can be made to travel back and forth via the protrusion 53 threadedly engaged with the ball screw 50.

The traveling support base 45 is formed in such a shape that left and right side bodies above the linear ball slide guide rails 46 are connected by two connecting portions 45a and 45b as shown in FIG. 5 (plan view), the front connecting portion 45b is located at a backwardly recessed position, between the both connecting portions 45a and 45b is formed an octagonal bore elongated in the left and right directions, and side walls are erected along the contour of the bottom wall having such shape.

On the lower surface of the bottom wall are provided linear ball slide guides 47 at four corners on the front and rear sides and on the left and right sides. They are slidably fitted to the linear ball slide guide rails 46 from below.

A cutting device 60 and an attraction device 120 are respectively suspended from the connecting portions 45a and 45b connecting the left and right side bodies behind and in front of the octagonal bore at the center of the traveling support base 45.

Figure 6:
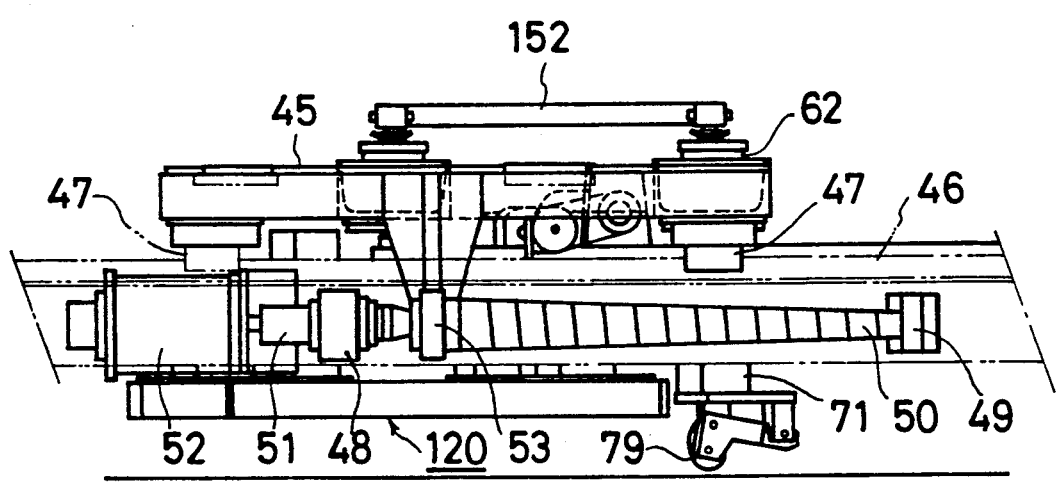
FIG. 6 is a side view of the same.
Figure 7:
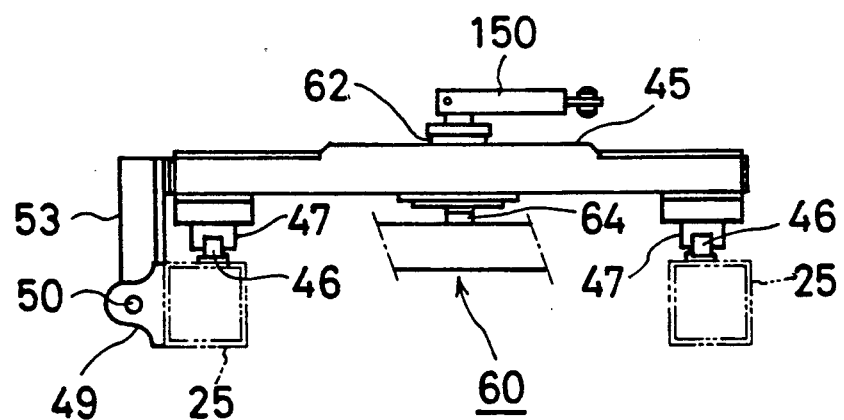
FIG. 7 is an end view as viewed in the direction of an arrow VII in FIG. 5.

In the following a, description will be made on the cutting device 60 with reference to FIGS. 5 to 7.

At the center of the rear connecting portion 45a of the traveling support base 45, a support plate 61 is mounted between the top ends of the front and rear side walls. A bearing 62 is fitted and secured to corresponding circular holes drilled in the same support plate 61 and a bottom wall thereunder.

The cutting device 60 is elongated in the horizontal direction and has its central portion fixedly secured to the bottom end portion of a support shaft 64 which is supported by the aforementioned bearing 62 as penetrating it vertically. The cutting device 60 is suspended so as to be rotatable about a vertical axis jointly with the support shaft 64.

Under a horizontally elongated support frame 65 in the cutting device 60 is suspended a cylinder 71 to travel along the support frame 65 and to be allowed to move in the direction at right angles to the same traveling direction. A disc-shaped knife 79 is rotatably supported via a pivot from a rod projected downwards from the cylinder 71.

At one end of the support frame 65 is provided a motor 88, whose rotation is transmitted via reduction gears to a pulley 84, and the cylinder 71 is made to travel by revolution of a belt extended around the pulley 84.

It is to be noted that in the proximity of the pulley 84 is disposed an approach switch 93 which generates trigger pulses in response to rotation of the pulley 84. On the basis of the trigger pulses a traveling position of the cylinder 71, that is, the position of the knife 79 can be detected.

On the other hand, the support frame 65 which is rotatable about the support shaft 64 is inclined at an angle with respect to the conveying direction of the belt-like member as shown in FIG. 5. At a position corresponding to the octagonal bore provided at the center of the traveling support base 45 in front of the support shaft 64, a circular shaft is supported from the support frame 65 so as to be movable in the left and right directions. The circular shaft 99 can be moved leftwards and rightwards via a toothed belt 104 by a servo motor 102 disposed next to the circular shaft 99.

Referring to FIG. 5, the upwardly projected circular shaft 99 is positioned within the octagonal bore at the center of the traveling support base 45. A bracket 105 is projected horizontally from the bottom wall of the front connecting portion 45b of the traveling support base 45 towards the inside of the octagonal bore. The above-described circular shaft 99 is loosely fitted from the below into an elongated circular hole 106 drilled in the bracket 105.

Accordingly, when the servo motor 102 is driven, the circular shaft 99 butts against the inner circumference of the elongated circular hole 106 and is prevented to move, and on the contrary, the support frame 65 is rotated about the support shaft 64 by a reaction force. In this way, a cutting angle with respect to the belt-like member can be finely adjusted.

By moving the traveling support base 45 in the front and rear directions the support frame 65 can be set at the cutting position, and this cutting position is a position above the magnet block 20 extending obliquely at the rear among the magnets blocks illustrated in FIG. 3, in correspondence to the magnet block 20. An anvil 110 which is an elongated knife receiver plate is also obliquely mounted between the left and right conveyor frames 6a at a position above the magnet block 20 (See FIG. 2), and the conveyor belt moves between the magnet block 20 and the anvil 110. The anvil 110 is made of paramagnetic material or non-magnetic material.

Accordingly, the belt-like member 15 conveyed by the conveyor belt 12 would advance as overriding the anvil 110, so that when it stops at a predetermined position, the portion of the belt-like member to be cut is placed on the anvil 110, and it is cut on the anvil 110 by the knife 79.

Since the belt-like member has a large number of steel cords buried therein at a predetermined bias angle, when the cutting portion of the belt-like member 15 is placed on the anvil 110 and the magnet block 20 is raised, the magnet block 20 attracts the belt-like member 15 downwards, and thereby the belt-like member can be stuck onto the anvil 110 and held in position. By cutting under the above-mentioned condition, the belt-like member 15 can be properly cut.

At the time of cutting, if the knife 79 is lowered by driving the cylinder 71 after it has been set at a predetermined position, the knife 79 descends on a side edge portion of the belt-like member 15 held on the anvil 110, a V-shaped knife edge bites in the belt-like member 15, and when it reaches the anvil 110, the portion of the belt-like member 15 right under the knife edge is cut.

At this moment, in the event that the steel cord 16 should exist right under the knife edge, the knife 79 that is movable in the direction at right angles to its traveling direction, would escape in that direction because a reaction force of a rubber portion in the vicinity of the steel cord 16 is large. Also, it would bite in the rubber portion between the adjacent steel cords 16 and would never cut the steel cord 16.

In addition, the V-shaped knife edge would bite in while drawing in the outer surface skin of the belt-like member on the left and on the right. Hence, the steel cord is always kept coated by rubber, and as the rubber is cut when the knife edge has reached the anvil 110, the steel cord 16 would not be exposed at the cut surface.

After the knife 79 has penetrated in the side edge portion of the belt-like member 15, if the knife 79 is made to travel by driving the motor 88, the knife 79 would continue to cut the rubber between the adjacent steel cords 16 along the steel cords 16. When it has reached the other side edge of the belt-like member 15, the cutting is completed.

Figure 15A:
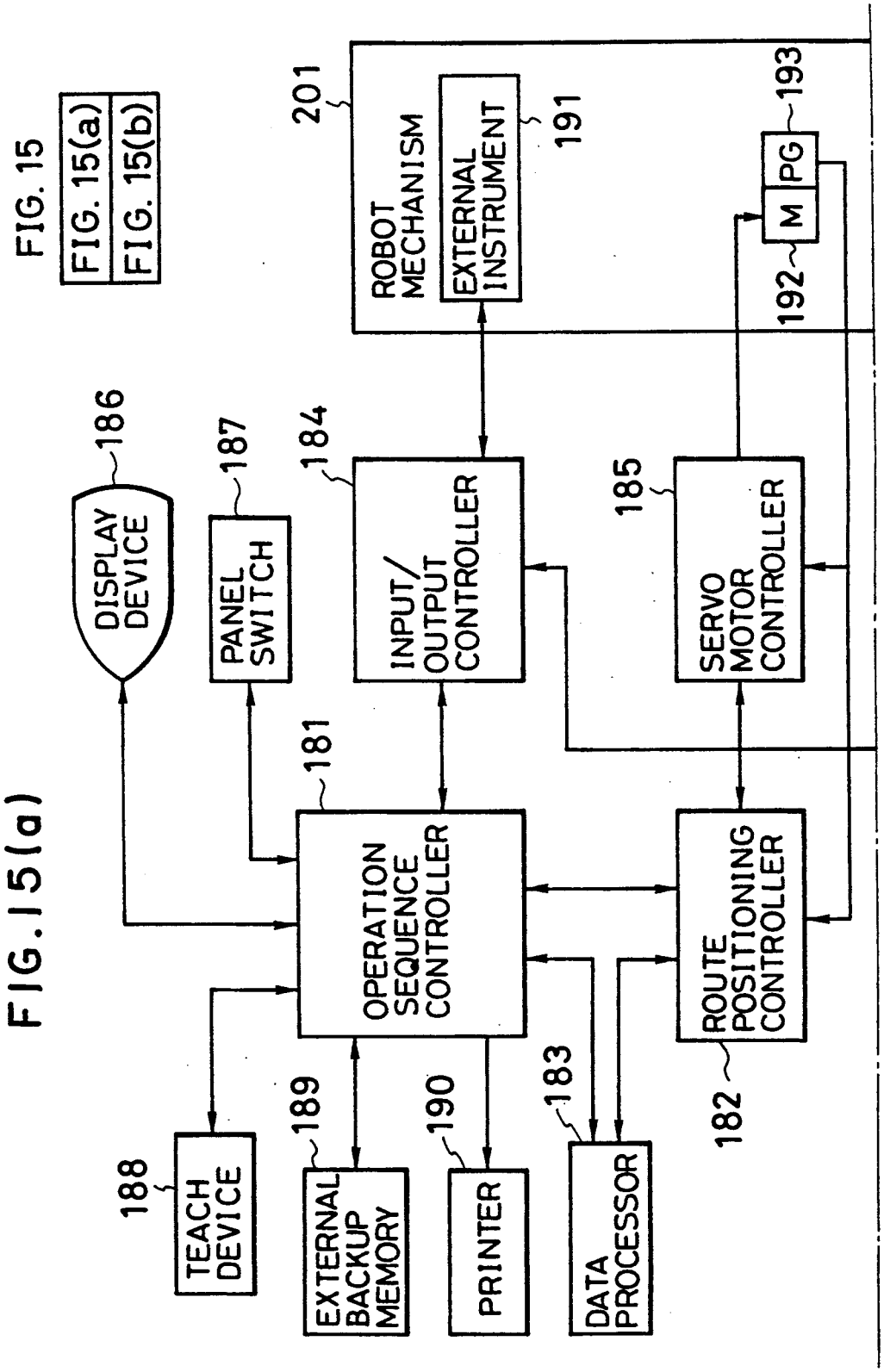
FIG. 15 is a schematic block diagram of a control system for the illustrated apparatus.
Figure 15B:
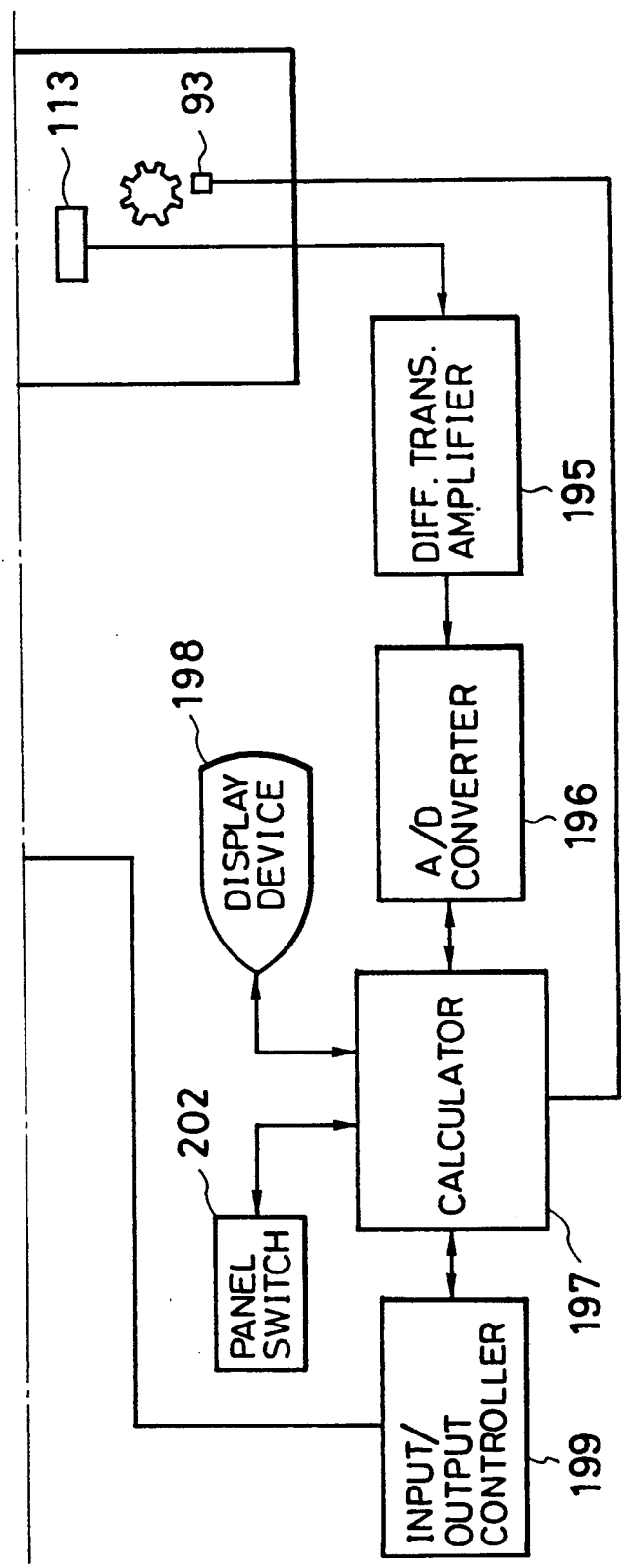

It is to be noted that the amount of deviation of the knife 79 in the direction at right angles to the traveling direction can be detected at any arbitrary time by means of a differential transformer 113 (FIG. 15). Accordingly, if a knife 79 set just before cutting travels and if it should deviate from a preset traveling line along which the belt-like member is to be cut, the amount of deviation would be detected by the differential transformer 113 at any arbitrary time.

On the other hand, a traveling position of the knife 79 is detected by the aforementioned approach switch 93.

Since the knife 79 performs cutting along the steel cord 16 buried in the belt-like member 15, if the steel cord 16 is curved, then the cut line is also curved in the same shape. Since the traveling position and the amount of deviation from the preset traveling line of the knife 79 are detected moment by moment as the knife 79 travels, the shape of the cut line and the cut angle can be known.

The above-described cutting device could be modified into a cutting device 300 as illustrated in FIGS. 17 to 20.

In the modified cutting device 300, struts 302 are erected on the left and right conveyor frames 6b and 6a, respectively, via support plates 301, and between the top ends of the respective struts 302 are mounted a horizontal support plate 303. The respective struts 302 are disposed as displaced in position in the back and forth directions from each other, accordingly the horizontal support plate 303 is inclined at an angle with respect to the traveling direction of the conveyor belt 12. This angle is conformed to a standard value of the bias angle of the steel cords 16 in the belt-like member 12 to be conveyed on the conveyor belt 12.

On the lower surface of the horizontal support plate 303 is laid a linear ball slide guide rail 304 as directed in the lengthwise direction of the horizontal support plate 303. A linear ball slide guide 305 is slidably fitted to this rail 304. A traveling support member 306 is fixedly secured to the bottom surface of this linear ball slide guide 305.

Brackets 309 and 310 pivotably supporting rotary shafts 307 and 308, respectively, at their lower end portions are provided as hanging vertically downwards from the front sides of the left and right end portions of the horizontal support plate 303. To the rotary shaft 307 is fixedly fitted a driven pulley 311, and to the rotary shaft 308 is fixedly fitted a drive pulley 312. Between the respective pulleys 307 and 308 is looped a toothed belt 313, and the above-mentioned traveling support member 306 is fixedly secured by screws 314 to a predetermined location of the upper side traveling portion of this belt 313.

On the upper surface of the horizontal support plate 303 in the proximity of the drive pulley 312 is disposed a motor 316 as supported by a support plate 315, and to the drive shaft of this motor is fixedly fitted a pulley 317. On the other hand, to the rotary shaft 30 that is integral with the aforementioned drive pulley 312 is fixedly fitted a pulley 318 in juxtaposition to the drive pulley 312. A toothed belt 319 is looped between this pulley 318 and the above-mentioned pulley 317. Accordingly, the toothed belt 313 revolves as driven by the motor 316, and accompanying the revolution of the toothed belt 313, the traveling support member 306 travels along the rail 304.

On the inside surface of the strut 302 on the side of the driven pulley 311, a sensor bracket 320 is provided as projecting forwards at the position of the same level as the driven pulley 311. The sensor bracket 320 is bent into an L-shape at its front end, and a reflection type optical sensor 321 is fixed on its surface opposed to the front side surface of the driven pulley 311.

Onto the front side surface of the driven pulley a reflective tape is stuck on which a circle is divided into 8 equal sectors and the every other sectors are provided with unreflective portions, so that depending upon the angular position during rotation of the driven pulley 311, an intensity of reflected light received by the reflection type optical sensor 321 is varied.

Accordingly, when the driven pulley 311 rotates as a result of traveling of the traveling support member 306, that is, revolution of the toothed belt 313, the reflection type optical sensor 321 detects the rotary state of the driven pulley 311. By counting the number of variations of the detected value, the traveling position of the traveling support member 306 can be derived.

On the bottom surface of the traveling support member 306 is provided a rail 323 for a ball slide table 322 as directed in the direction at right angles to the traveling direction. A cylinder 324 is fixedly secured to the bottom surface of the ball slide table 322 slidably fitted to the rail 323. The cylinder 324 is suspended under the traveling support member 306, and it can slide along the rail 323 in the direction at right angles to the direction of traveling of the traveling support member 306.

Figure 20:
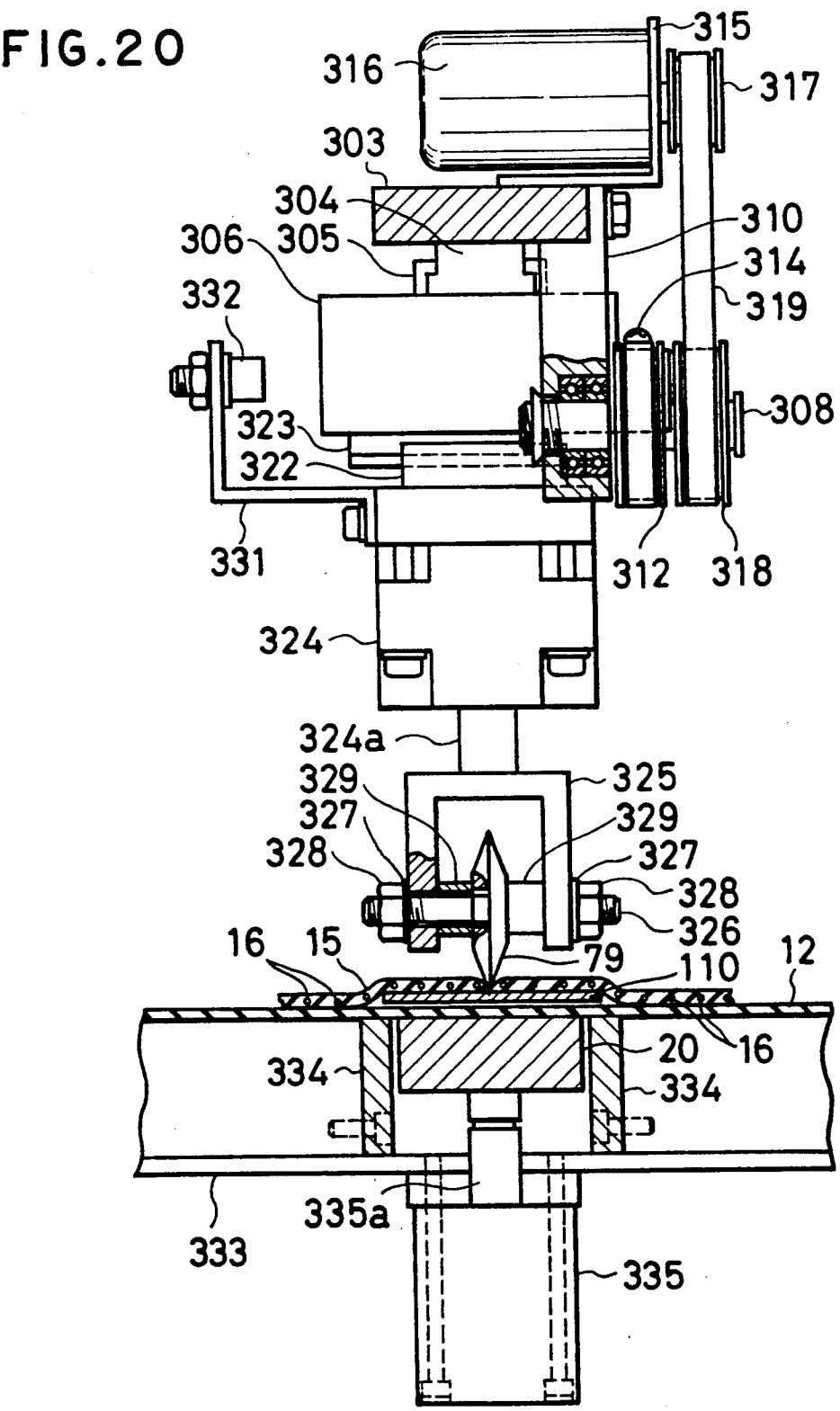
FIG. 20 is an end view partly in cross-section taken along line XXX—XXX in FIG. 17 as viewed in the direction of arrows.

At the bottom end of a downwardly projecting cylinder rod 324a of the cylinder 324, is fixedly secured a knife bracket 325 having a U-shaped cross-section. As shown in FIG. 20, a bolt 326 penetrates horizontally through left and right side pieces of the knife bracket 325. It is fixedly secured to the knife bracket 325 by means of washers 327 and nuts 328 at the opposite ends. On the bolt 326 is rotatably supported a disc-shaped knife 79 at the center as positioned by left and right spacers 329.

The knife 79 rotatably supported from the knife bracket 325 in the above-described manner, rises and falls in accordance with contraction and extension of the cylinder rod 324a. In addition, this knife 79 can move in the traveling direction of the traveling support member 306, and also can move in the direction at right angles to the above-mentioned traveling direction.

A sensor bracket 331 projects backwards from the rear side surface of the cylinder 324. The rear end portion of this bracket 331 is bent upwards to be opposed to the rear side surface of the traveling support member 306, and an optical distance sensor 332 is mounted to the rear end portion so as to be opposed to the support member 306. Accordingly, the distance sensor 332 moves in the direction at right angles to the traveling direction of the support member 306, jointly with the cylinder 324 and relatively to the traveling support member 306. The distance sensor 332 can detect the distance from the traveling support member 306 at any arbitrary time.

In other words, the above-described reflection type optical sensor 321 detects the position of the knife 79 in the traveling direction, while the distance sensor 332 can detect the position of the knife 79 in the direction at right angles to the traveling direction. The detection signals issued from the reflection type optical sensor 321 and distance sensor 332 are digitized. The configuration of the cut surface is known and stored in the form of coordinate values.

Figure 18:
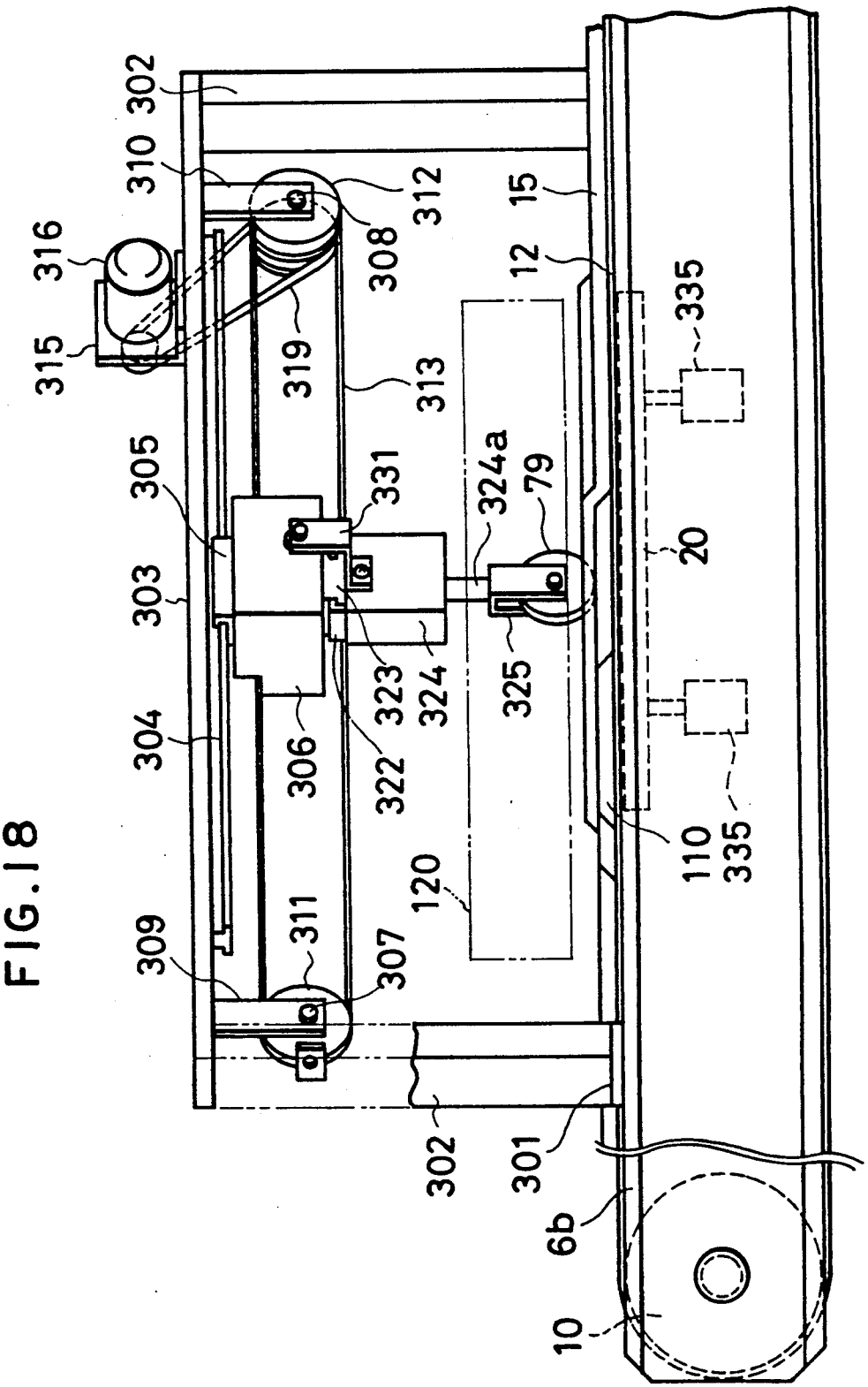
FIG. 18 is a side view of the same.
Figure 19:
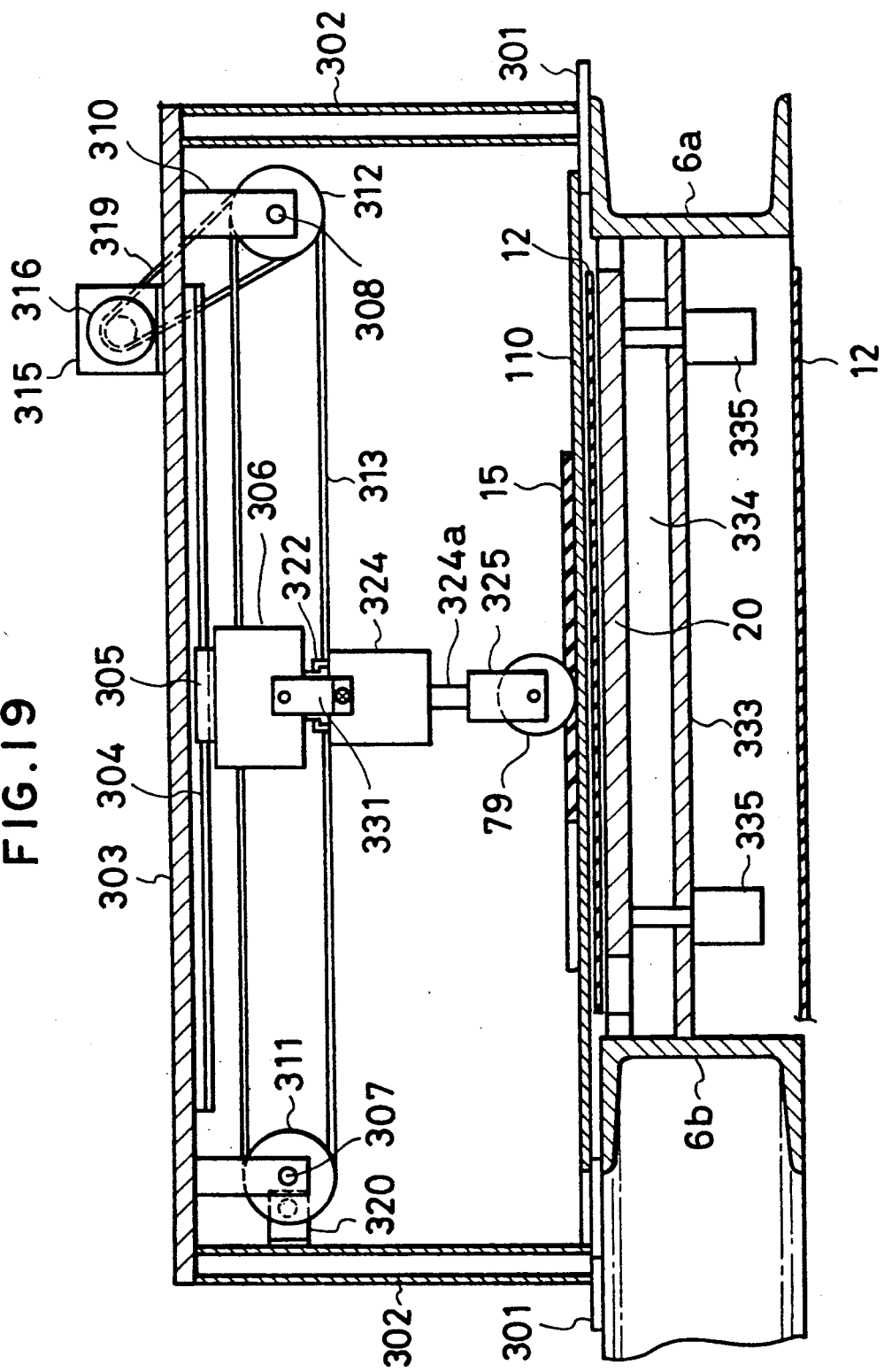
FIG. 19 is a cross-section view taken along line IXX—IXX in FIG. 17 as viewed in the direction of arrows.

The anvil 110 described previously with reference to FIG. 2, is disposed under the horizontal support plate 303 in parallel thereto (FIGS. 18, 19 and 20). This anvil 110 is made of non-magnetic hard stainless steel, and for instance, stainless steel having a hardness of Hv 400 or higher and being hard to be scratched is employed. As described previously, the anvil 110 is mounted above and close to the conveyor belt 12 to obliquely traverse the belt 12, and the belt-like member 15 having been conveyed to the anvil 110 by the conveyor belt 12 is further conveyed as overriding the anvil 110.

Under the conveyor belt 12 is disposed the previously described magnet block 20 of parallelogram shape so as to be movable vertically at the position opposed to the anvil 110. In addition, between the left and right frames 6b and 6a is mounted a support plate 333, and on this support plate 333 are erected guide plates 334 respectively along the front and rear side edges of the magnet block 20. The top ends of the guide plates 334 ar located close to the lower surface of the conveyor belt 12.

Two cylinders 335 are fixed to the lower surface of the support plate 333, their cylinder rods 335a project upwards penetrating through circular holes in the support plate 333, and are fixedly secured to predetermined positions on the lower surface of the magnet block 20. When the cylinder rods 335a are extended by actuating the cylinders 335, the magnet block 20 would be raised along the plate 334, and at the fully raised position, the upper surface of the magnet block 20 comes close to the lower surface of the conveyor belt 12.

In the case where the magnet block 20 is present at the raised position, the belt-like member 15 on the anvil 110 is held in tight contact with the anvil 110 and its configuration is maintained because the steel cords 16 buried within the belt-like member 15 are attracted downwards by the magnetic force of the magnet block 20. Then, under this condition, cutting by means of the knife 79 is carried out. The cutting is effected in a similar manner to the case of the previously described cutting device 60.

When the magnet block 20 is present at the lowered position, the belt like member 15 on the anvil 110 is not subjected to the influence of the magnetic force of the magnet block 20. Since the anvil 110 itself is also made of non-magnetic material and not magnetized, the belt-like member 15 can move freely, and the conveyance can be performed easily.

Figure 8:
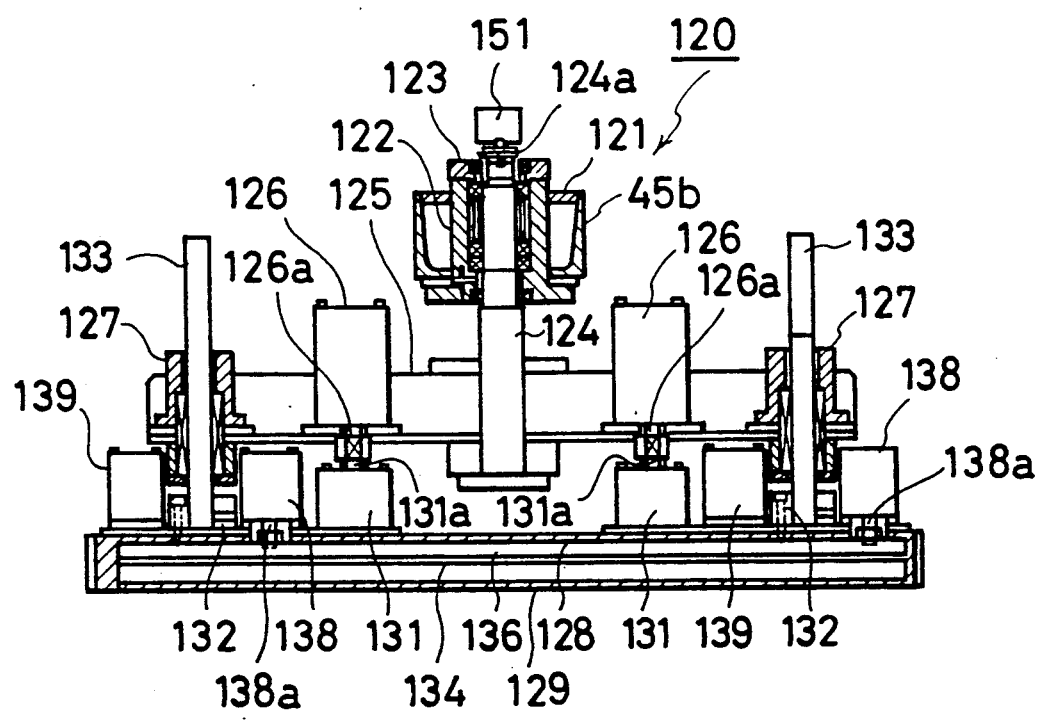
FIG. 8 is a side view partly in cross-section of an attraction device.
Figure 9:
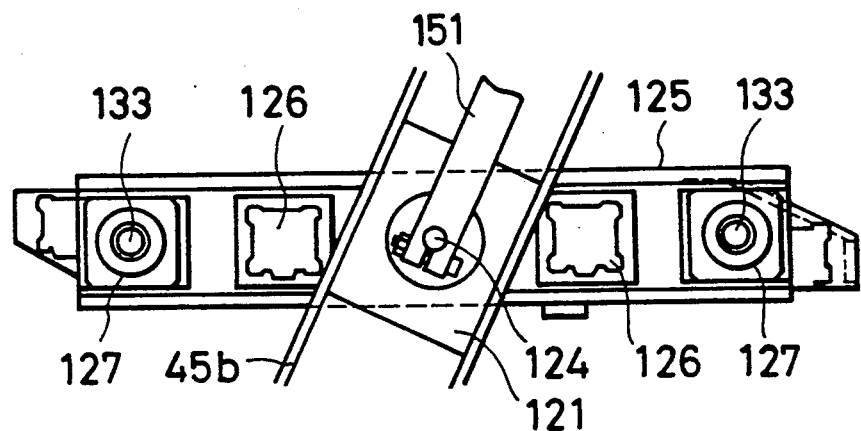
FIG. 9 is a plan view of the same device.
Figure 10:
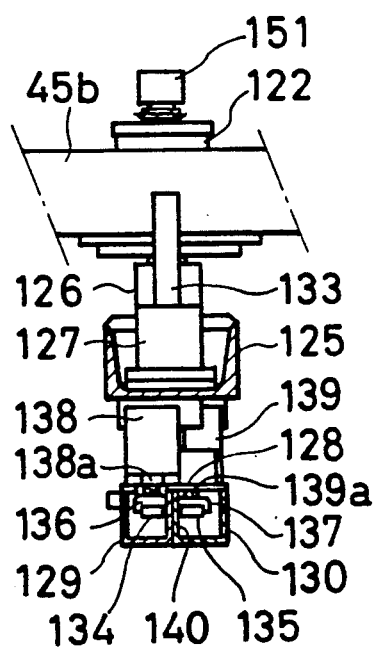
FIG. 10 is a front view partly in cross-section of the same device.
Figure 11:
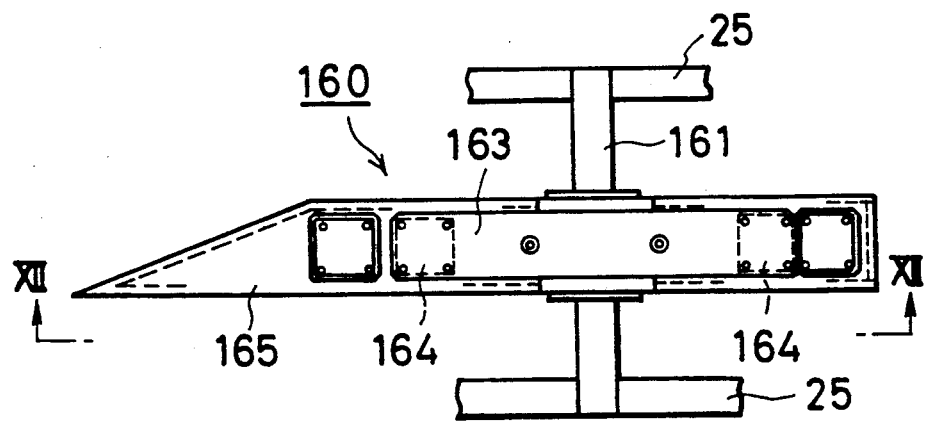
FIG. 11 is a plan view of an attraction hand.
Figure 12:
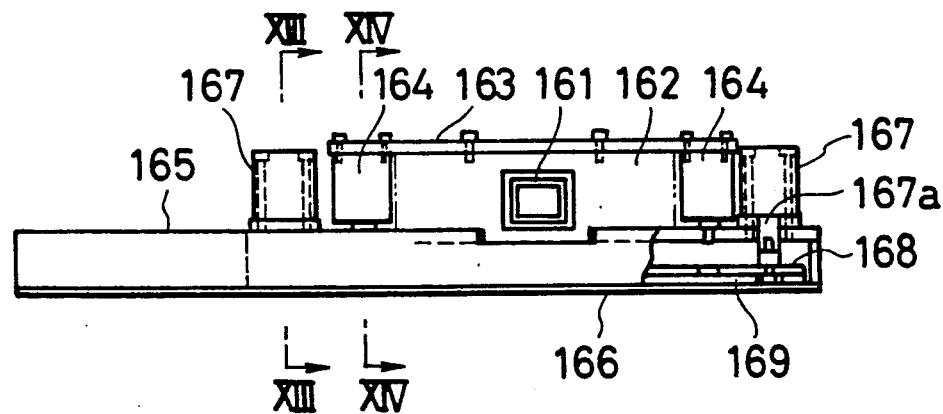
FIG. 12 is a cross-section view taken along line XII—XII in FIG. 11 as viewed in the direction of arrows.
Figure 13:
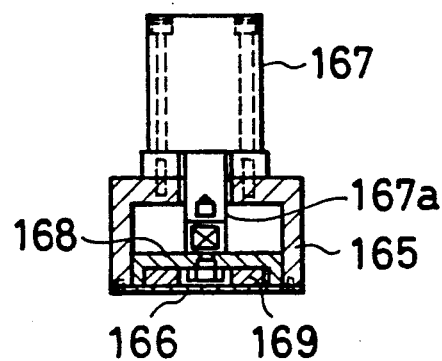
FIG. 13 is a cross-section view taken along line XIII—XIII in FIG. 12 as viewed in the direction of arrows.
Figure 14:
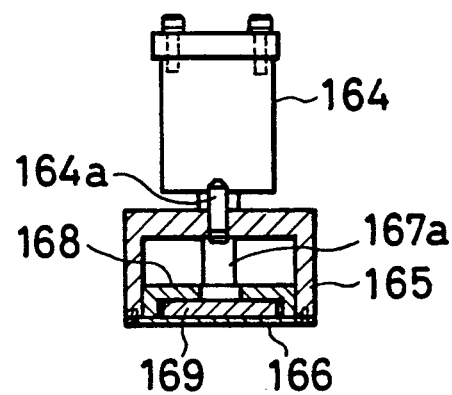
FIG. 14 is a cross-section view taken along line XIV—XIV in FIG. 12 as viewed in the direction of arrows.

Next a, description will be made on an attraction device also suspended from the traveling support base 45, with reference to FIGS. 8 to 10.

At the center of the front connecting portion 45b of the traveling support base 45, a support plate 121 is mounted between the top ends of the front and rear walls, and a bearing 122 is fitted and secured to corresponding circular holes drilled in the support plate 121 and a bottom wall under the support plate 121.

A support shaft 124 vertically penetrating through the same bearing 122 is rotatably fitted to the bearing 122 and a washer 123 above the bearing 122. It is supported from the bearing 122 by means of a nut 124a threadedly mated with a screw portion at the upper part of the support shaft 124.

At the bottom portion of the support shaft 124 is fixedly secured and supported a support frame 125 that is elongated in the horizontal direction and is U-shaped in cross-section, at its central portion, and the support frame 125 is suspended in a horizontally rotatable manner about the support shaft 124.

To the support frame 125 are fixedly secured cylinders 126 on the opposite sides of the support shaft 124, and further bearings 127 are fixedly secured thereto on the both left and right end portions thereof.

Under such support frame 125 is positioned an elongated rectangular horizontal support plate 128 as opposed to the support frame 125 in parallel thereto. Onto the lower surface of this horizontal support plate 128 are fixedly secured two rectangular pipes 129 and 130 as held in contact with each other. Upwardly projected rods 131a of a pair of left and right cylinders 131 fixed to the upper surface of the horizontal support plate 128 supporting the rectangular pipes 129 and 130, and downwardly projected rods 126a of the cylinders 126 on the side of the above-described support frame 125 are coaxially coupled, and the horizontal support plate 128 and the rectangular pipes 129 and 130 are suspended via the rods 126a and 131a.

At the positions further displaced to the left and to the right from the cylinders 131 on the horizontal support plate 128, guide shafts 133 are provided as projected upwards with their lower end portions fixed, and the guide shafts 133 slidably and vertically penetrate through the bearings 123 on the side of the above-mentioned support frames 125.

Accordingly, by extending and contracting the cylinder rods 126a and 131a as a result of driving of the cylinders 126 and 131, the rectangular pipes 129 and 130 can be lowered and raised as guided by the guide shafts 133.

Within the rectangular pipes 129 and 130 are respectively contained elongated permanent magnets 134 and 135 as gripped from the above by holders 136 and 137. The holders 136 are fixedly secured to the lower ends of rods 138a projected downwards into the front side rectangular pipe 129 of a pair of left and right cylinders 138 fixed on the horizontal support plate 128. When the rods 138a extend and contract as a result of driving of the cylinders 138, the permanent magnet 134 is lowered and raised within the rectangular pipe 129.

Likewise, the holders 137 are fixedly secured to the lower ends of rods 139a projected downwards into the rear side rectangular pipe 130. Hence, when the rods 139a extend and contract as a result of driving of the cylinders 139, the permanent magnet 135 is lowered and raised within the rectangular pipe 130.

The attraction device 120 has the above-mentioned construction, hence the main body suspended via the support shaft 124 can rotate about the support shaft 124. Also as a result of driving of the cylinders 126 and 131, the rectangular pipes 129 and 130 can be raised and lowered, and the permanent magnets 134 and 135 within the rectangular pipes 129 and 130, respectively, can be separately and independently raised and lowered by driving the cylinders 138 and 139, respectively.

Accordingly, after the belt-like member 15 has been cut, if the mutual joining surface of the rectangular pipes 129 and 13 is positioned along the vertical plane aligned with the cutting surface, the lower surfaces of the rectangular pipes 129 and 130 are made to abut against the upper surfaces of the end portions of the belt-like member 15 before and behind the cutting surface by lowering the rectangular pipes 129 and 130, and the permanent magnets 134 and 135 are lowered respectively within the rectangular pipes 129 and 130. Then, the end portions of the belt-like member 15 before and behind the cutting surface are attracted to the lower surfaces of the rectangular pipes 129 and 130 and they are raised upwards simultaneously with rise of the rectangular pipes 129 and 130.

At this moment, if it is desired to attract only one of the end portions of the belt-like member 15 before and behind the cutting surface, it is only necessary to lower only one of the magnets.

It is to be noted that when it is desired to release the attracting action, if the magnet is raised, the corresponding end portion of the belt-like member 15 is separated from the lower surface of the rectangular pipe.

The above-described attraction device 120 and the above-described cutting device 60 are both suspended from the traveling support base 45, and as shown in FIG. 5, they can rotate while always maintaining the parallel condition to each other.

More particularly, the support shafts 64 and 124 of the cutting device 60 and the attraction device 120, respectively, penetrate upwardly the bearings 62 and 122 fixed to the traveling support base 45, at the top ends of these support shafts are provided rotary arms 150 and 151, respectively, as directed horizontally in parallel to each other with their base end portions fitted and secured to the support shafts, between the free end portions of the rotary arms 150 and 151 is mounted a connecting rod 152. The opposite end portions of the connecting rod 152 are pivotably engaged with the rotary arms 150 and 151.

Accordingly, when the cutting device 60 is rotated by driving the servo motor 102 as described above, rotation of the support shaft 64 causes the support shaft 124 to rotate via the rotary arm 150, the connecting rod 152 and the rotary arm 151, thus the attraction device 120 can be rotated at the same speed, and both the cutting device 60 and the attraction device always maintain their parallel condition.

Next a, description will be made of an attraction hand 160 provided above the upstream end of the conveyor belt 12 (See FIG. 2) with reference to FIG. 11 to 14.

Between the above-described pair of left and right upper frames 25 is mounted a horizontal support frame 161 consisting of a tubular body having a rectangular cross-section, and a frame 162 is suspended as directed in the front and rear directions and fixedly supported at the center between the left and right upper frames 25 by being penetrated by the horizontal support frame 161.

On the top surface of the frame 162 is extended a support plate 163, a pair of cylinders 164 are fixedly secured to the lower surfaces of the opposite end portions of the support plate 163 projected back and forth from the frame 162, and to the lower end portions of rods 164a projected downwards of the cylinders 164 is fixedly secured and suspended a casing 165 having a U-shaped cross-section which is elongated in the front and rear directions.

The casing 165 is formed in a wedge shape having its front end cut obliquely, and a non-magnetic steel plate 166 is extended so as to close its opening directed downwards.

Onto the upper surface of the casing 165 are fixedly secured a pair of cylinders 167 at the front and at the rear, and rods 167a of these cylinders 167 project into the casing 165 as penetrating the upper wall of the casing 165 downwards.

Within the casing 165 is contained a magnet 169 gripped by a holder 168, and this holder 168 is fixedly secured to the tip ends of the rods 167a of the above-described cylinders 167 to be suspended therefrom in a vertically movable manner within the casing 165.

The holder 168 is loosely fitted along the inner contour of the casing 165, and the magnet 169 gripped by the holder 168 is also a flat plate elongated in the front and rear directions, whose front end is sharpened in a wedge shape.

The attraction hand 160 is constructed in the above-described manner. Hence the casing 165 is raised and lowered by driving the cylinders 164, and by driving the cylinders 167 placed on the casing 165, the magnet 169 is raised and lowered within the casing 165.

Accordingly, when the belt-like member 15 on the conveyor belt 12 is to be attracted, by extending the rods 164a of the cylinders 164 the casing 165 is lowered onto the belt-like member 15. Subsequently, if the magnet 169 is lowered by extending the rods 167a of the cylinders 167, the magnet 169 attracts the belt-like member 15 to the steel plate 166.

Under this attracted condition, if the rods 164a are contracted, the belt-like member 15 rises as being kept attracted, and separates from the conveyor belt 12.

When the belt-like member 15 is to be placed on the conveyor belt 12, if the casing 165 is lowered and the magnet 169 is raised, the belt-like member 15 is present on the conveyor belt 12 and the attraction effect is released. Hence, if the casing 165 is raised by itself, the belt-like member 15 is left on the conveyor 12.

The above-mentioned is the structure of the sticking apparatus for a belt-like member according to the present invention. Now a description will be made on a drive control system for such apparatus on the basis of the schematic block diagram illustrated in FIG. 15.

In FIG. 15 reference numeral 181 designates an operation sequence controller which stores position information and the like of a predetermined operation program, the program stored in this operation sequence controller 181 is produced, for instance, by manipulating a panel switch 187 and a display device 186 for confirmation of information, and also position information stored in the operation sequence controller 181 is what was instructed from an instruction device 180.

Position information reproduced from the aforementioned operation sequence controller 181 according to an operation program is sent to a data processor 183. In this data processor 183, a rotational speed and an amount of rotation of the servo motor 192 are calculated on the basis of various parameters which were preliminarily stored.

It is to be noted that in the event that the calculated results should exceed a preliminarily stored limit speed and limit amount of rotation, an alarm signal is sent to the operation sequence controller 181, and thereby the overall operation is stopped.

If the above-mentioned results of calculation are sent from the data processor 183 to a route positioning controller 182, the route positioning controller 182 drives a servo motor 192 via a servo motor controller 185.

The servo motor 192 involves 6 motors in total consisting of the above-described servo motors 3, 13, 39, 52, 88 and 102 alotted for the respective uses.

In response to rotation of the servo motor 192, pulse signals are sent from a pulse generator 193 to the servo motor controller 185 and the route positioning controller 182, and the well-known servo control is effected.

Reference numeral 184 designates an input/output controller, which transmits signals sent from an external instrument 191 to the operation sequence controller 181. It also transmits a control signal issued from the operation sequence controller 181 to the external instrument 191 to control the external instrument 191.

In addition, an external backup memory 189 can register or read out preservation programs in cooperation with the operation sequence controller 181.

Furthermore, reference numeral 190 designates a printer for outputting a program and the like preserved and stored in the external backup memory 189 and the operation sequence controller 181.

As described previously, the differential transformer 113 detects an amount of deviation of a cutter from a predetermined traveling line during cutting when the belt-like member is cut by the cutting device 60.

A differential transformer amplifier 195 amplifies a minute output voltage of the differential transformer 113 up to a high voltage.

An A/D converter 196 converts an output voltage from the differential transformer amplifier 195 to a digital output.

Trigger pulses issued from the approach switch 93 are used as timing signals for inputting the data sent from the A/D converter 196 to a calculator 197.

The calculator 197 takes in the digital input sent from the A/D converter 196 in response to the timing signals consisting of the trigger pulses, then arithmetically processes this digital input. It calculates an amount of correction for an angle and an amount of correction for a length.

A display device 198 displays results of calculation.

A panel switch 202 is used upon start and stop of the calculator 197 and formation of a program.

An input/output controller 199 performs signal level matching for transferring the results of calculation by the calculator 197 to the operation sequence controller 181.

A series of operation procedures controlled by the control system as described above will be explained sequentially in the following with reference to FIGS. 16(a) to 16(i).

FIGS. 16(a) to 16(i) illustrate the successive steps of the operation of cutting out a belt-like member from a raw material and wrapping and sticking it around and to a cylindrical drum. In the respective figures are shown a drum 1, a conveyor belt 12, magnet blocks 17, 18, 19, 20 and 21 disposed within a conveyor 6 in a vertically movable manner, an anvil 110 provided above the magnet block 20 with the conveyor belt 12 interposed therebetween, rectangular pipes 129 and 130 (containing magnets 134 and 135 therein) and a knife 79 included in a cutting device 60 and an attraction device 120 suspended from a traveling support base, a casing 165 (containing a magnet 169 therein) of an attraction hand 160, and a belt-like member 15.

First, the belt-like member 15 is carried in onto the conveyor belt 12 from the rear of the conveyor 6, the conveyor belt 12 is revolved by driving the servo motor 13, and the belt-like member 15 is fed in up to the position where the tip end of the belt-like member 15 goes over the anvil 110.

The cutting device 60 is moved as driven by the servo motor 52 until the knife 79 comes to the cutting position, and it is rotated as driven by the servo motor 102 up to the cutting angle predetermined in the process of the belt-like member 15 to be ready for cutting.

Under the condition where the belt-like member 15 has been made free on the conveyor belt 12 by lowering the magnet blocks 18, 19, 20 and 21 under the conveyor belt 12, the servo motor 39 is driven to perform positioning in the lateral direction while pinching the belt-like member 15 from the left and the right with the centering arms 36, then the positioned belt-like member 15 is attracted to the conveyor belt 12 and the anvil 110 by raising the magnet blocks 18, 19, 20 and 21, and the centering arms 36 are opened.

Next, the knife 79 in the cutting device 60 is positioned at the start position on the one side edge of the belt-like member 15 as driven by the motor 88, then the knife 79 is lowered by driving the cylinder 71. The belt-like member 15 is cut by making the knife 79 travel along a predetermined traveling line as driven by the motor 88.

During the cutting operation, signals detected by the approach switch 93 and the differential transformer 113 are sent to the route positioning controller 182, where a cut configuration, an amount of angle correction, an amount of length correction and the like are calculated and sent to the operation sequence controller 181, in which they are stored.

Figure 16A:
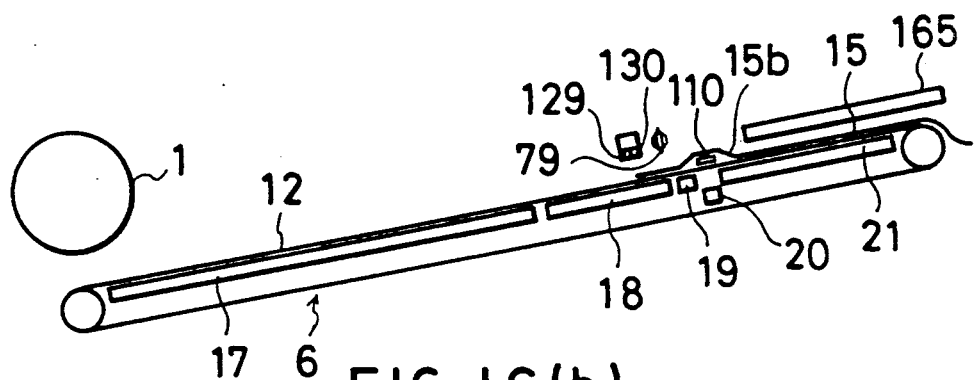
FIGS. 16(a) to 16(i) are schematic views showing the successive steps of the operation of the illustrated apparatus.

After the cut-out tip end portion of the belt-like member 15 has been removed, if the belt-like member 15 is made to advance further by a distance 1, the state shown in FIG. 16(a) is realized. This condition is a start condition of a series of cycle operations to be repeated subsequently.

At first, the magnet blocks 18, 19, 20 and 21 are lowered and the centering arms 36 are closed up to a preset width to perform lateral positioning of a belt-like member 15b. Then the magnet blocks 18, 19 and 21 are raised, and the centering arms 36 are opened.

The belt conveyor 12 is revolved to make the belt-like member 15b advance by a predetermined length $l_2$.

Then, lateral positioning is effected again, and the belt-like member 15b is made to advance by a predetermined length $l_3$ by revolving the conveyor belt 12.

The above-mentioned total distance $l_1 + l_2 + l_3$ over which the belt-like member 15b has advanced after cutting of the leading end of the belt-like member 15b, is equal to the circumferential length L of the drum.

Figure 16B:
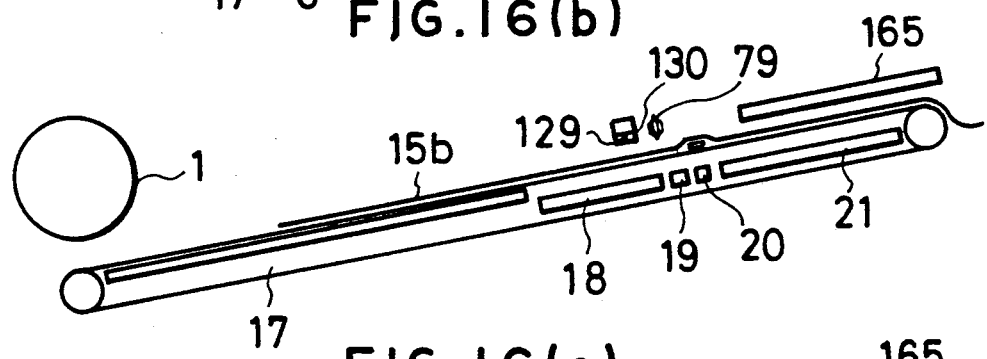

Again, lateral positioning is carried out (FIG. 16(b)), subsequently the cutting device 60 is moved to the cutting position. The inclination angle of the cutting device 60 is set at the process angle.

Regarding the above-mentioned setting of the angle, upon initial setting after the preparatory operation the setting operation is unnecessary because the cutting device 60 is already set at the process angle, but after the subsequent repeated operations are started, it becomes necessary.

Figure 16C:
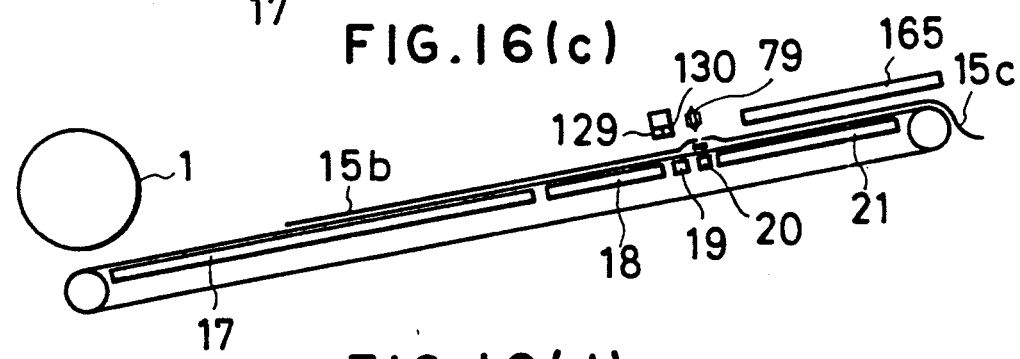

Subsequently, all the magnet blocks 18, 19, 20 and 21 including the magnet block 20 right under the anvil 110 are raised to attract and hold the belt-like member 15b, the belt-like member 15b is cut by the knife 79, and the knife 79 is raised (FIG. 16(C)).

Figure 16D:
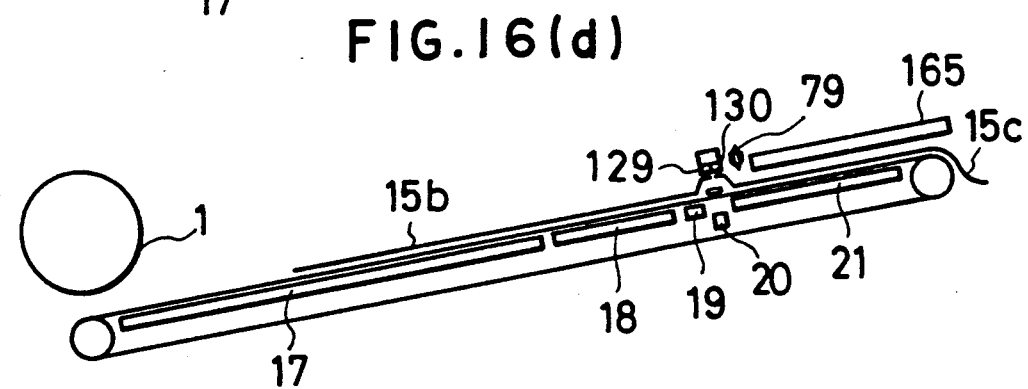

Then the rectangular pipes 129 and 130 are retreated to align their joining surface 140 (FIG. 10) with the predetermined traveling line of the knife 79, the end portions of the belt-like members 15b and 15c before and behind the cut surface are raised by the attraction device 120 (FIG. 16(d)). Both the conveyor belt 12 and the attraction device 120 are made to advance at the same speed by the distance 11 so that the leading end of the rear belt-like member 15c may go over the anvil 110.

At this moment, the rectangular pipe 129 attracting the trailing end of the belt-like member 15b cut into a desired length, is rotated by driving the servo motor 102 by the amount of correction of the angle which was derived through calculation after cutting. Thereby correction for matching the trailing end of the belt-like member 15b with the angle of the leading end, is effected.

Under such condition, the rectangular pipes 129 and 130 are lowered, only the permanent magnet within the rectangular pipe 129 is raised, and the trailing end of the belt-like member 15b is made to be attracted to the conveyor belt 12. Then, if the rectangular pipes 129 and 130 are raised, the leading end of the rear belt-like member 15c is raised while it is kept attracted to the rectangular pipe 130.

The trailing end of the belt-like member 15b at the front can be attracted to and held on the side of the conveyor belt 12 while maintaining its configuration corrected by the rotation of the rectangular pipe 129 and conformed to the cut angle of the leading end, since the magnetic force of the permanent magnet 134 is larger than that of the magnet blocks 17, 18.

Figure 16E:
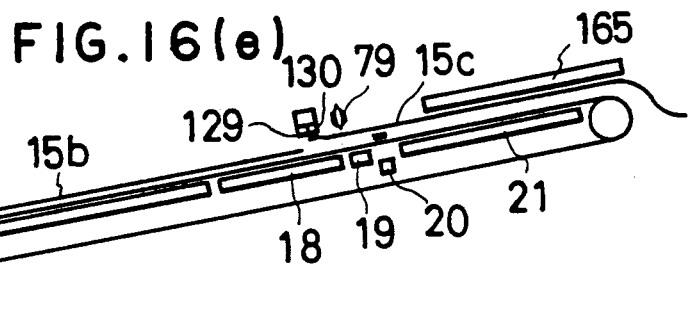
Figure 16F:
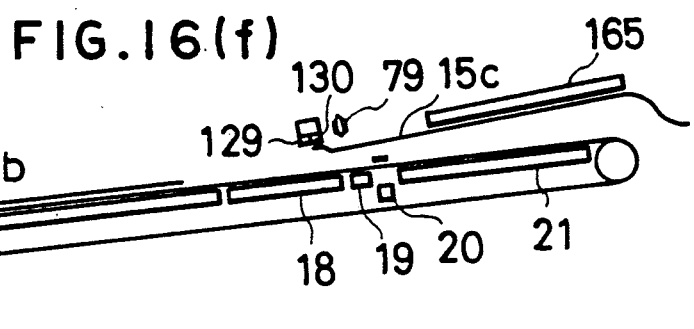
Figure 16G:
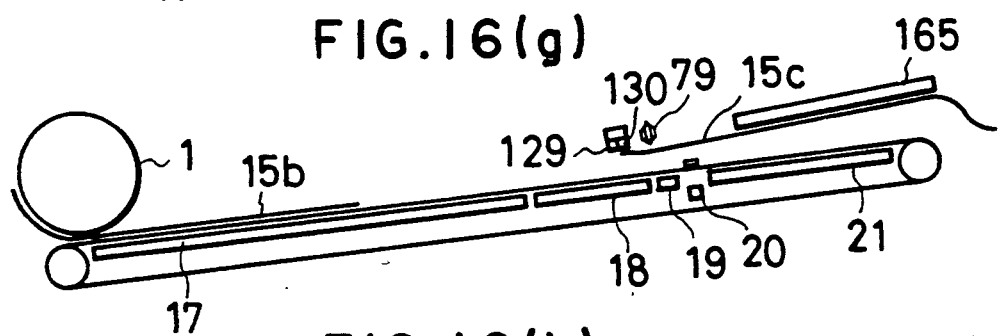
Figure 16H:
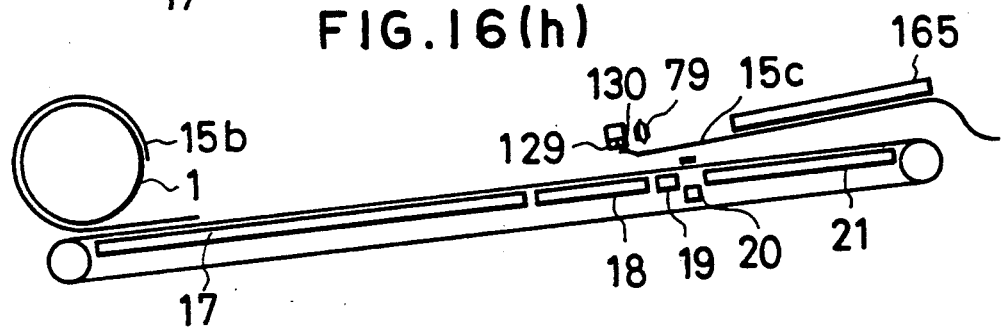
Figure 16I:
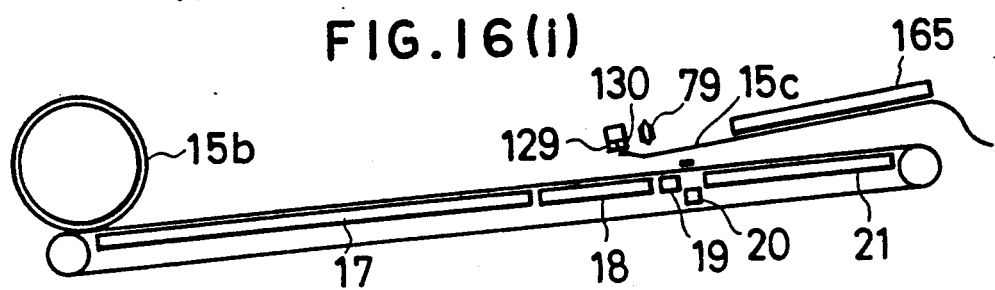

Subsequently, the rear belt-like member 15c is attracted to the casing 165 by the suction device 160 and thereby raised (FIG. 16(e)). Then, the cut belt-like member 15b is conveyed forwards by revolving the conveyor 12, and the leading end of the belt-like member 15b is positioned at a sticking start position under the drum 1.

Since the belt-like member 12b is attracted to and held on the conveyor belt 12 by the magnet blocks 17, 18, and 19 even during conveyance, the shapes of the leading and trailing ends can be maintained.

Next, the conveyor 6 is made to swing by driving the cylinder 22, thereby the front end of the conveyor 6 is raised. The leading end of the belt-like member 15b is pinched by the outer circumferential surface of the drum 1 and the conveyor belt 12 (FIG. 16(f)).

Within the drum 1 is contained a permanent magnet, not shown, and by means of this permanent magnet, the leading end of the belt-like member 15b is attracted to the outer circumferential surface of the drum 1.

The drum 1 and the conveyor belt 12 are driven while equalizing the circumferential speed of the drum 1 and the linear conveying speed of the conveyor belt by synchronizing the servo motor 3 and the servo motor 13. Thereby the triangular portion at the leading end of the belt-like member 15b is wrapped around the drum 1 (FIG. 16(g)).

Subsequently, the central portion of the belt-like member 15b having the triangular portions at the leading and trailing ends removed, is wrapped around the drum 1 while controlling the relative speed between the drum 1 and the conveyor belt 12 (FIG. 16(i h)).

This control is executed on the basis of the amount of correction for a length which was calculated at the time of the above-described cutting, the drum 1 is made to have a somewhat faster speed so that the belt-like member 15b tends to be stretched, and control is effected in such manner that the interval between the steel cords 16 buried within the belt-like member 15b may have a predetermined dimension.

The triangular portion at the trailing end of the belt-like member 15b is wrapped around the drum 1 by driving the drum 1 and the conveyor belt 12 at the same speed (FIG. 6(i)).

The belt-like member 15b wrapped around the circumference of the drum 1 in the above-described manner has its opposite end portions surely conformed, and there is no fear that stepped misalignment may occur. Also, overlap or separation of the end portions will not occur because the trailing end angle of the belt-like member is corrected to conform to the leading end angle and the length is also adjusted.

In addition, the interval between the steel cords 16 within the belt-like member 15b also falls in a predetermined range, and so, the end portions can be surely joined.

Next, by driving the cylinder 22, the conveyor 6 is made to swing and returned to its original inclination angle, the belt-like member 15b sticked to the drum 1 has its end portions joined together, and then it is extracted.

Then the rectangular pipes 129 and 130 which are held at the state where they corrected the trailing end angle of the belt-like member 15b, are returned again to the original process angle by driving the servo motor 102, and the next belt-like member 15c which has attracted and raised by the rectangular pipe 130 and the casing 165 is transferred to the conveyor belt 12.

This condition is the same condition as that shown in FIG. 16(a), and subsequently, the steps of the process shown in FIGS. 16(a) to 16(i) are repeated.

As described in detail above, according to the present invention, the inclination angle of the cut line at the leading end of the belt-like member is measured at the time of cutting, the inclination angle of the cut line at the trailing end is measured at the time of cutting at the trailing end. By comparing the inclination angle of the cut line at the trailing end with the inclination angle at the leading end, an amount of correction for the inclination angle is calculated. After cutting, the trailing end portion is corrected so as to conform to the leading end angle by rotating an attraction device which attracts and holds the trailing end portion on the basis of the above-mentioned amount of correction for the inclination angle, the belt-like member is wrapped around a drum while maintaining the corrected condition and the end portions are joined together, and therefore, the leading end and the trailing end would surely coincide, and proper joining not associated with stepped deviation can be realized.

In the method according to the present invention, since a trailing end angle of a belt-like member is corrected so as to conform to a leading end angle and the belt-like member is stuck to the drum while maintaining the corrected condition, the leading end surface and the trailing end surface align with each other and joining can be achieved properly.

Furthermore, with the apparatus according to the present invention, since a leading end cut angle of a belt-like member is measured by measure means, after cutting of a trailing end the trailing end surface of the belt-like member can be aligned with the leading end surface by changing an attitude of hold means for holding the trailing end by correction means on the basis of the measured cut angle, and the corrected trailing end surface is maintained in shape and stuck to a cylindrical drum by attraction means and hold means, the leading end and the trailing end can be always made to coincide properly, inconveniences such as stepped deviation would not occur, and improvements in quality can be realized.

Still further, compactization of the entire apparatus is possible, and reduction of an installation cost can be achieved.

What is claimed is:

1. A method for sticking a belt-like member, wherein a belt-like member prepared by cutting a raw material of the belt-like member on a conveyor at two front and rear locations, is conveyed by said conveyor, wrapped around a cylindrical drum and stuck to the drum comprising the steps of:

cutting said raw material of the belt-like member on an anvil placed on said conveyor while being fixedly attracted toward a conveyor belt and said anvil to form a leading end edge of said belt-like member and simultaneously measuring an inclination angle of the cut line;

holding the leading end portion of said belt-like member, separating it from said anvil, conveying it as synchronized with the conveyor up to a predetermined position beyond the anvil, and then fixedly attracting it onto the conveyor belt;

conveying said raw material for the belt-like member having the leading end edge formed by a predetermined distance by means of said conveyor belt;

cutting said raw material for the belt-like member on said anvil while being fixedly attracted toward said conveyor belt and said anvil to form a trailing end edge of said belt-like member and simultaneously measuring an inclination angle of the cut line;

holding cut end portions before and after the cut line, separating the cut end portions from said anvil, and conveying the cut end portions synchronized with the conveyor to a predetermined position downstream of the anvil;

changing the holding attitude of said trailing end portion on the basis of the measured inclination angles of the respective cut lines to correct the inclination angle of the cut line of the trailing end edge so as to coincide with the inclination angle of the cut line of the leading end edge;

transferring the trailing end portion of the belt-like member onto the conveyor belt while maintaining the thus corrected configuration of the trailing end portion and fixedly attracting it to the conveyor belt;

separating the succeeding raw material of the belt-like member from the conveyor belt;

conveying the belt-like member cut out of said raw material which is fixedly attracted toward said conveyor belt by means of the conveyor belt;

attracting the leading end portion of the belt-like member to said cylindrical drum; and wrapping and sticking said belt-like member around and to the cylindrical drum by rotating the cylindrical drum in synchronism with traveling of the conveyor belt.

2. A method for sticking a belt-like member as in claim 1, wherein cutting of the raw material of the belt-like member is effected after a portion to be cut is fixedly attracted onto said anvil over the entire width of said portion by means of a knife moving along a prearranged traveling line, and said cut line inclination angle is measured by detecting an amount of deviation of said knife from said prearranged traveling line and the position along said prearranged traveling line of said knife.

3. A method for sticking a belt-like member as in claim 1, wherein correction of the inclination angle of the cut line of the trailing end edge is effected by obtaining an inclination angle of the cut line of the leading end edge; obtaining an inclination angle of the cut line of the trailing end edge; comparing said inclination angles to obtain a deviation angle of the trailing end edge from the leading end edge; holding cut end portions before and after the cut line at the trailing end edge respectively and separating said cut end portions from the anvil and the conveyor belt simultaneously; and changing the holding attitude of said trailing end portion by the same angle as said obtained deviation angle.

4. A method for sticking a belt-like member as in claim 1, wherein the belt-like member is fixedly attracted toward the conveyor belt by moving a plurality of magnet disposed under said conveyor belt selectively toward said conveyor belt and separated from said conveyor belt by moving said magnets selectively away from said conveyor belt.

5. A method for sticking a belt-like member as in claim 1, wherein the anvil is made of paramagnetic or non-magnetic material, and the belt-like member is fixedly attracted toward said anvil by moving a magnet close to said anvil, interposing said conveyor between said anvil and said magnet by moving said magnet away from said conveyor belt so that said belt-like member is not attracted.

6. A method for sticking a belt-like member as claimed in claim 1, wherein the wrapping and sticking step comprises contacting and sticking a front tip of the belt-like member fixedly attracted to the conveyor belt to the cylindrical drum, wrapping said belt-like member around said drum while equalizing he circumferential speed of said drum and the linear conveying speed of said conveyor belt, abutting said front tip and a rear tip of said belt-like member and joining said front and rear tips to each other without overlap or separation.

7. A method for sticking a belt-like member having steel cords embedded therein, wherein a belt-like member prepared by cutting a raw material of the belt-like member on a conveyor at two front and rear locations, is conveyed by said conveyor, wrapped around a cylindrical drum and stuck to the drum; characterized by the steps of:

cutting said raw material of the belt-like member on an anvil made of a non magnetic material placed on said conveyor while being fixedly held on a conveyor belt and said anvil to form a leading end edge by means of a magnet moving into position under said anvil of said belt-like member and simultaneously measuring an inclination angle of the cut line;

holding the leading end portion of said belt-like member, separating it from said anvil, conveying it as synchronized with the conveyor up to a predetermined position beyond the anvil, and then fixedly attracting it onto the conveyor belt;

conveying said raw material for the belt-like member having the leading end edge formed by a predetermined distance by means of said conveyor belt;

cutting this raw material for the belt-like member on said anvil while being fixedly held to said conveyor belt and said anvil to form a trailing end edge of said belt-like member and simultaneously measuring an inclination angle of the cut line;

holding cut end portions before and after the cut line, separating them from said anvil, and conveying them as synchronized with the conveyor up to a predetermined position beyond the anvil;

changing the holding attitude of said trailing end portion on the basis of the measured inclination angles of the respective cut lines to correct the inclination angle of the cut line of the trailing end edge so as to coincide with the inclination angle of the cut line of the leading end edge;

transferring the trailing end portion of the belt-like member onto the conveyor belt while maintaining the thus corrected configuration of the trailing end portion and fixedly attracting it toward the conveyor belt;

separating the succeeding raw material of the belt-like member from the conveyor belt;

conveying the belt-like member cut out of said raw material which is fixedly attracted toward said conveyor belt by means of the conveyor belt;

making the cylindrical drum attract the leading end portion of the belt-like member; and wrapping and sticking said belt-like member around and to the cylindrical drum by rotating the cylindrical drum in synchronism with traveling of the conveyor belt.

8. A method for sticking a belt-like member as claimed in claim 7, wherein cutting of the raw material of the belt-like member is effected after a portion to be cut is fixedly attracted toward said anvil over the entire width of said portion by means of a circular disc-shaped knife moving along a prearranged traveling line, and said cut line inclination angle is measured by detecting an amount of deviation of said knife from said prearranged traveling line and the position along said prearranged traveling line of said knife.

* * * * *